US006983306B1

(12) United States Patent
Sameshima et al.

(10) Patent No.: US 6,983,306 B1
(45) Date of Patent: Jan. 3, 2006

(54) INTER-DEVICE COOPERATIVE CONTROL METHOD

(75) Inventors: Shigetoshi Sameshima, Yokohama (JP); Katsumi Kawano, Kawasaki (JP); Koichi Sano, Yokohama (JP); Motohisa Funabashi, Machida (JP); Masanori Kataoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 09/650,138

(22) Filed: Aug. 29, 2000

(30) Foreign Application Priority Data

Nov. 12, 1999 (JP) .......................................... 11-322115

(51) Int. Cl.
*G06F 15/16* (2006.01)
*G06F 9/46* (2006.01)

(52) U.S. Cl. ........................ 709/205; 709/201; 718/106

(58) Field of Classification Search ................. 709/205, 709/201, 106, 202; 718/106
See application file for complete search history.

(56) References Cited

U.S. PATENT DOCUMENTS

| | | | | | |
|---|---|---|---|---|---|
| 6,029,188 | A | * | 2/2000 | Uyama | 709/102 |
| 6,073,176 | A | * | 6/2000 | Baindur et al. | 709/227 |
| 6,300,904 | B1 | * | 10/2001 | Dvorak et al. | 342/457 |
| 6,374,306 | B1 | * | 4/2002 | Tognazzini | 709/248 |
| 6,414,955 | B1 | * | 7/2002 | Clare et al. | 370/390 |
| 6,683,538 | B1 | * | 1/2004 | Wilkes, Jr. | 340/903 |

OTHER PUBLICATIONS

Smith, Reid The Contract Net Protocol: High–Level Communication and Control in a Distributed Problem Solver, IEEE, 1980.*

Bestavros et al. "Probabilistic job scheduling for distributed real–time applications" In Proceedings of the First IEEE Workshop on Real–Time Applications, pp. 97–101. May 1993.*

Fischer et al. "A Model for Cooperative Transportation Scheduling". In Proceedings of the First International Conference on MultiAgent Systems, AAAi Press/MIT Press, San Francisco, California, pp. 109–116. 1995.*

(Continued)

*Primary Examiner*—Hosain Alam
*Assistant Examiner*—David Lazaro
(74) *Attorney, Agent, or Firm*—Mattingly, Stanger, Malur & Brundidge, P.C.

(57) ABSTRACT

The present invention relates to a distributed system in which processors incorporated in machines and objects are mutually linked in operation, and an object of the present invention is to provide a distributed system in which each device can establish a link with a suitable device according to changes in the environment and conditions, independently from the system configuration controlled by a server.

In order to achieve the above object, each device provided by the present invention obtains information on surrounding devices through a sensor 131 or communication processing 112, recognizes the environment around it through environment recognition processing 111, and stores the environmental information in an environment management table 123. By employing link control processing 113, each device shares conditional information stored in a profile 122 and a policy 124 of each device through the communication processing 112. Each device locally and continuously determines a device to be linked with it or whether to perform a link operation requested by another device, using the shared conditional information, information on the surrounding environment, and the policy 124. The results of a link operation are made public and shared by each device through the link control processing 113, and used for narrowing the range of link target devices.

15 Claims, 29 Drawing Sheets

OTHER PUBLICATIONS

Lin et al. "An Agent–based Flexible Routing Manufacturing Control Simulation System" Proceedings of the 26th conference on Winter simulation, pp. 970–977 1994.*

Transactions on Computers, vol. C–29, No. 12, Dec. 1980, 1104–1113, Entitled: The Contract Net Protocol: High–Level Communication and Control in a Distributed Problem Solver, by Reid G. Smith, Member of IEEE, IEEE.

* cited by examiner 311 312 313 314

| DEVICE NAME | DEVICE TYPE | RELATIVE POSITION | UPDATE TIME |
|---|---|---|---|
| | | | |
| | | | |
| | | | |

| 611 | 612 | 613 | 614 | 615 |
|---|---|---|---|---|
| ROUTE NUMBER | POINT (FROM) | ABSOLUTE POSITION (FROM) | POINT (TO) | ABSOLUTE POSITION (TO) |
| | | | | |
| | | | | |
| | | | | |
| | | | | |
| | | | | |
| | | | | |

Figure 8:
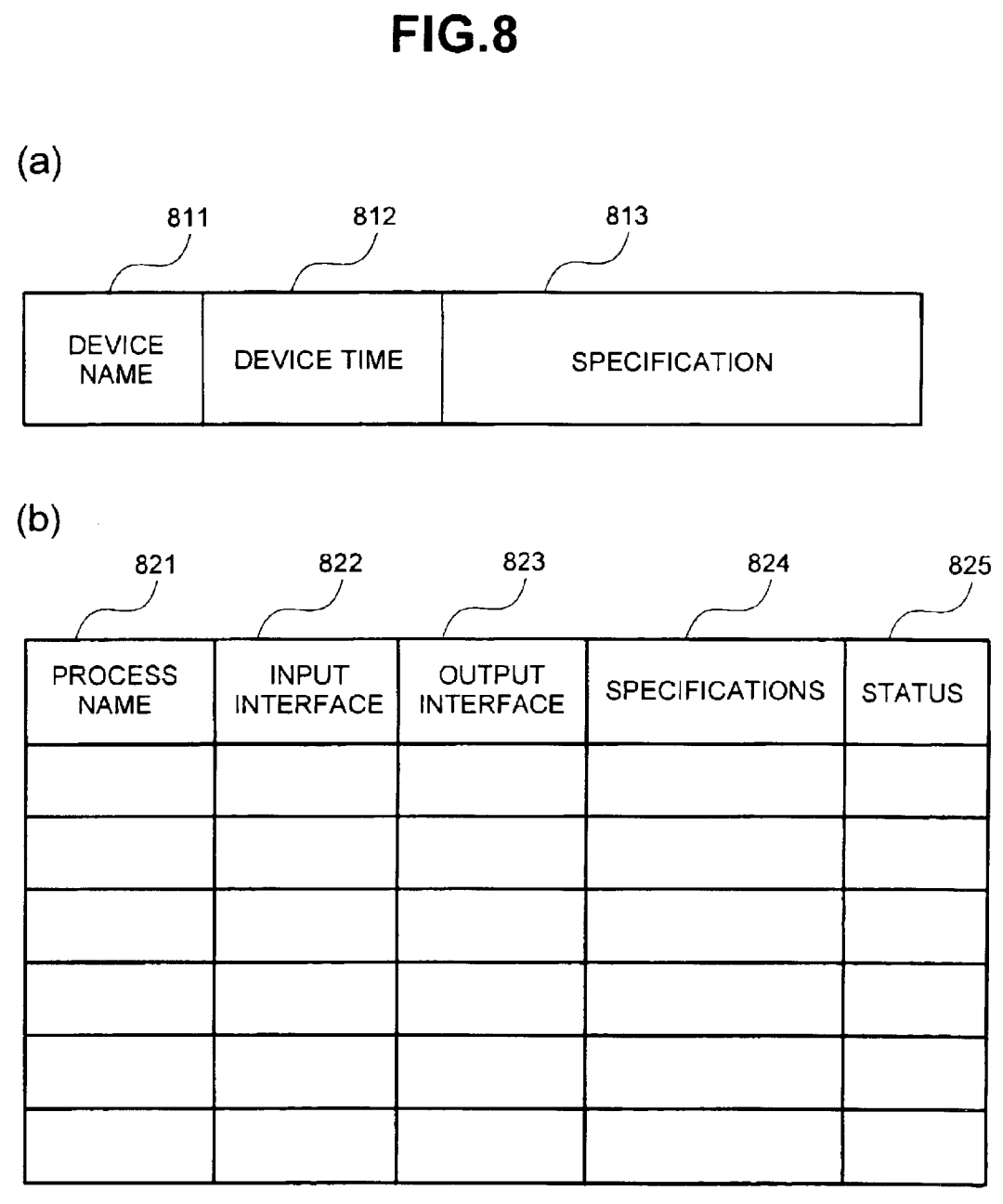

| DEVICE NAME | DEVICE TIME | SPECIFICATION |
|---|---|---|

(b)

821 822 823 824 825

| PROCESS NAME | INPUT INTERFACE | OUTPUT INTERFACE | SPECIFICATIONS | STATUS |
|---|---|---|---|---|
| | | | | |
| | | | | |
| | | | | |
| | | | | |
| | | | | |
| | | | | |

| CURRENT CONDITIONS OF PRESENT DEVICE |
|---|

(b)

1112 1113

| LINK TARGET DEVICE NAME | LINK TARGET DEVICE TYPE |
|---|---|
| | |
| | |

(c)

1131 1132 1133 1134 1135

| CONDITIONS OF PRESENT DEVICE | PRIORITY | LINK TARGET DEVICE NAME/TYPE | LINK TARGET DEVICE CONDTIONS | LINK TARGET DEVICE SELECTON CONDTION |
|---|---|---|---|---|
| | | | | |
| | | | | |
| | | | | |
| | | | | |
| | | | | |
| | | | | |

FIG.19

| PURPOSE IDENTIFIER (1911) | LINK TARGET (DEVICE NAME, PROCESS NAME, INTERFACE NAME) (1912) | PROCESS NAME AND INTERFACE NAME OF PRESENT DEVICE (1913) | LINK STATE (1914) |
|---|---|---|---|
| | | | |
| | | | |
| | | | |
| | | | |
| | | | |
| | | | |

INTER-DEVICE COOPERATIVE CONTROL METHOD

BACKGROUND OF THE INVENTION

The present invention relates to a distributed system in which processors each incorporated in one of a plurality of control machines or objects are mutually linked in operation, and more particularly to a distributed system which is employed in the environment where the state of the surroundings of the control machines or the objects is continuously changed due to a transfer of a control machine or an object, or a change in a control target, and in the system, devices each included in or connected to one of the control machines or the objects having a function to mutually transmit/receive data and a function to perform a given process (for example, a function to perform a program) are mutually linked based on information on the physical environment in which the devices are placed, or are locally linked according to conditions based on information on their current operations such as what action or process each device is performing.

Since downsizing of semiconductor devices has progressed as higher-performance and finer semiconductors have been developed, use of a processor having a computational capability is not limited to dedicated computers but it has been incorporated into all types of devices. Furthermore, means for communicating with computer systems through these devices are being established, as represented by the Internet. A communication function which can be used by devices having the above communication function or devices in general is PHS (Personal Handyphone System). PHS provides voice communications between terminals. A terminal establishes a connection with the other terminal by explicitly dialing the other terminal's number, which is also used as its communication terminal address. In PHS, communication is disconnected by sending a termination instruction to a terminal.

A technique for searching a plurality of devices for a link target and establishing a link with it is described, for example, in IEEE Transaction Computer, Vol. C-29, No. 12, pp. 1104–1113 "The Contract Net Protocol: High-level Communication and Control in a Distributed Problem Solver".

According to a method described in the above IEEE document, a device searching for a link target sends a request, and a device which has received the request sends an index as a response indicating whether it can process the request. The device which has sent the request checks each index it receives, and determines a device to be linked. In this technique, however, each device must have the ability to estimate an index for each request. Furthermore, this technique has given no consideration to changes in the operational state of a linked device and dynamic changes in an estimated index. As processors have become smaller and shown higher performance, they have been incorporated in not only dedicated computers but also machines and objects which conventionally do not have a computational capability. On the other hand, these machines and objects each has its control target or role in the environment where it exists, and according to changes in the control target or the role, each machine or object may be moved, replaced with a new purchased one, or changed in its composition by assembling or disassembling it. It may also be necessary for the machines to change the contents of their processing or for the machines and objects to be mutually linked to perform a certain purpose.

The above conventional technique was developed mainly for management on the computer side, and therefore requires a device functioning as a server for controlling the configuration between devices, or a common transmission medium needed for searching for a link target. Because of this, in order to form a link, a device must search for another device having a matching function through a server, and furthermore, it is necessary to install a server that is not subjected to any movement or replacement, causing a problem in flexible configuration. Another problem is that it is difficult to replace a server in the environment in which a linked device or a machine having a linked device therein operates continuously. This means that it is difficult to replace a server according to technical advancement or to maintain the server. Furthermore, a range in which devices can be linked is limited to a range controlled by a server, and therefore, to link devices beyond each server control range, a linking mechanism between servers or a mechanism integrating a plurality of servers is required, resulting in a large and complicated mechanism employed on the computer system side. With no such a mechanism provided, a server control range must coincide with an actual operational control range. However, it is very difficult to design a server so that its control range will match an actual operational control range.

To form a link relationship between devices, a device provided by the above conventional technique communicates with a nearest server selected from among severs available such as earth stations, or determines a link target based on device specifications obtained from a server. Because of this, whether or not to establish a link, or which device to select from devices of the same type as a link target is dependent on static information such as device specifications. Each control target or object to which a link target device is connected differs in its control method, role, and importance, depending on its position and relative relationship with other devices. In the above conventional technique, however, a relationship between linked devices is not considered when their link is formed, and as a result, a problem arises that devices are linked even though their positions are not suitable for a link operation, or a device of no use is continuously operated. To avoid this, manual maintenance or regular maintenance is required, making it impossible to sufficiently reduce the user's time and labor, which is a purpose of creation of such a linking system.

Furthermore, since system conditions change with time according to the configuration and operational conditions of devices constituting the system, or changes in environmental conditions, it is often impossible to estimate the range of devices which should be linked in operation, beforehand. The above conventional technique has given no consideration to this uncertain state, and as a result, fails to accomplish its intended usability.

To maintain links between devices, the above conventional technique employs a server to manage the configuration of devices, and a device with which it has become possible to form a link is registered with the server. This causes another problem that when a device forms a link and then a more suitable link target appears, the device cannot detect the update in configuration. To detect a configuration update, it is necessary to wait for information provided by a server to be updated and to regularly make inquiries about an update to the server, which increases a load on the server when the number of devices employed in the system has increased. The above conventional technique has given no consideration to a method for updating links to form a link with a more suitable target according to changes in the conditions and positions of control targets or objects to which a link target device is connected, causing a problem in the usability of the system.

SUMMARY OF THE INVENTION

The inventor has recognized that in PHS, described above as a conventional technique, a new terminal to be added or a terminal excluded from a system must be managed by the user from outside the system. Even though PHS provides a current terminal position as one of its features, it is only used by earth stations for control. In addition, PHS employs explicit dialing for controlling a communication destination as described above, and therefore no physical terminal positions are used. On the other hand, the present invention uses physical positions as one of its features.

In order to achieve the above object described above, the present invention provides an inter-device cooperative control system and an apparatus therefor in which each device can change its operational conditions and the operational conditions of other devices linked or to be linked with the device based on information on its environment including the physical positions of devices, and information on device conditions including processes and actions being performed by the devices.

Here, the information on device conditions includes how much of a process to be performed by the device or to be performed on the device has been finished, or whether or not there is any difference between a process to be performed by the device or to be performed on the device and an actual process being performed, and, if there is any difference, the details of the difference.

The above operational conditions include the operational conditions of processing programs of each device and the operational conditions of other than processing programs.

In this system, to form a link according to changes in the environment and conditions, each device obtains information on the environment where it is placed and its conditions, and supplies the information to other devices so as to continuously recognize the environment and conditions in which the device and other devices are placed. Alternatively, each device attempts a link operation in response to a link request to determine whether it is possible to establish a link at each time point so as to change its own operational conditions and the operational conditions of other devices accordingly.

BRIEF DESCRIPTION OF THE DRAWINGS

FIG. 6 is a diagram showing a structure of map information provided by the second embodiment according to the present invention;

FIGS. 8(*a*) and 8(*b*) are diagrams showing structures of a device information storage table and a table storing the configurations of processes of a device which can be linked to processes of other devices in a profile provided by a third embodiment according to the present invention;

FIGS. 11(*a*) to 11(*c*) are diagrams showing a present device condition storage table, an authenticated device table, and a matching table in a policy provided by the fourth embodiment according to the present invention;

FIG. 19 is a diagram showing a structure of a dynamic link management table according to the third embodiment of the present invention;

DESCRIPTION OF THE PREFERRED EMBODIMENTS

Figure 1:
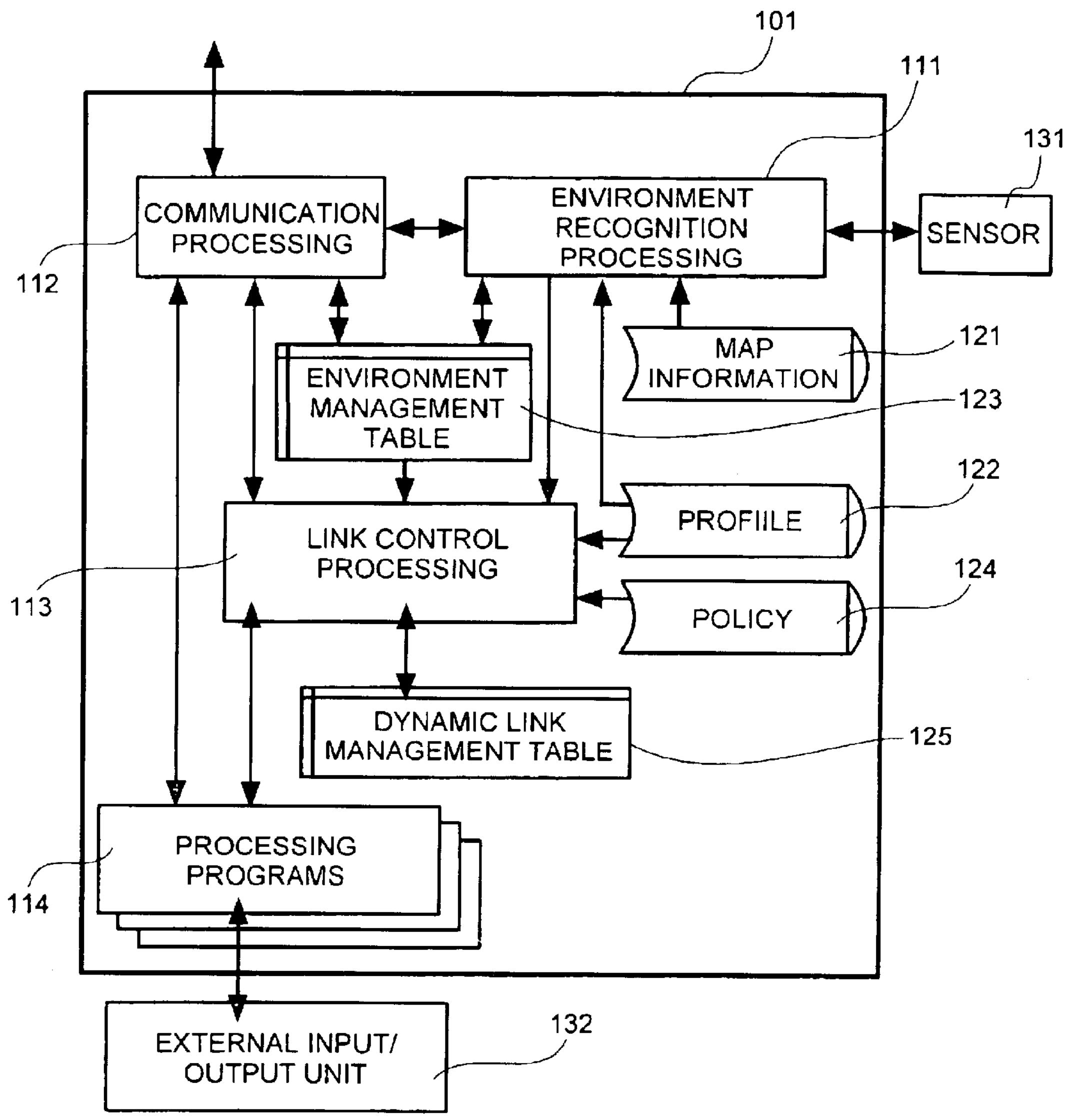
FIG. 1 show a configuration of a device to which the present invention is applied.

FIG. 1 shows a configuration of a device to which the present invention is applied. A device 101 comprises environment recognition processing 111 for recognizing the environment and determining surrounding devices, communication processing 112 for transmitting data to and receiving data from other devices, link control processing 113 for determining and controlling a link between processes of devices, and processing programs 114 for controlling devices.

The environment recognition processing 111 employed in a device acquires information on the environment where the device exists through a sensor 131, recognizes the positional relationship between the device and the surrounding devices based on the acquired environmental information, and supplies the recognition results to the link control processing 113. Here, the sensor 131 may be of a type which can not only acquire information from the environment but also send information around and receive information sent as a response so as to actively acquire information. Furthermore, by utilizing map information 121 used in the environment recognition processing, it is possible to recognize the relationship between a device and its surrounding devices and determine the surrounding devices. To recognize the environment, the embodiments described below provide two methods: one in which only information acquired through the sensor 131 is used and the other in which information on other devices acquired through the communication processing 112 is also used. However, other methods may be used to obtain environmental information.

Information on surrounding devices recognized is stored in an environment management table 123. The link control processing 113 compares a profile 122 of a device with a profile 122 of another device obtained through the communication processing 112, and determines a link target device or a link target process based on a policy 124. The profile 122 includes data of a device, such as the name and type, and information on processing programs of the device, forming a base for determining whether or not processes of devices should be linked, or whether or not it is possible to establish a link, given a current input/output data relationship. Information on currently linked devices and processing programs are stored in a dynamic link management table 125. The processing programs 114 control input/output of the information and devices through an external input/output unit 132. Here, the external input/output unit has a function to control the processing programs 114 executed in a device and refer to the output values through a man-machine interface such as a liquid crystal panel, a keyboard, or a touch panel. It should be noted that use of an external input/output unit is not a requirement, and some devices have no external input/output unit.

Figure 17:
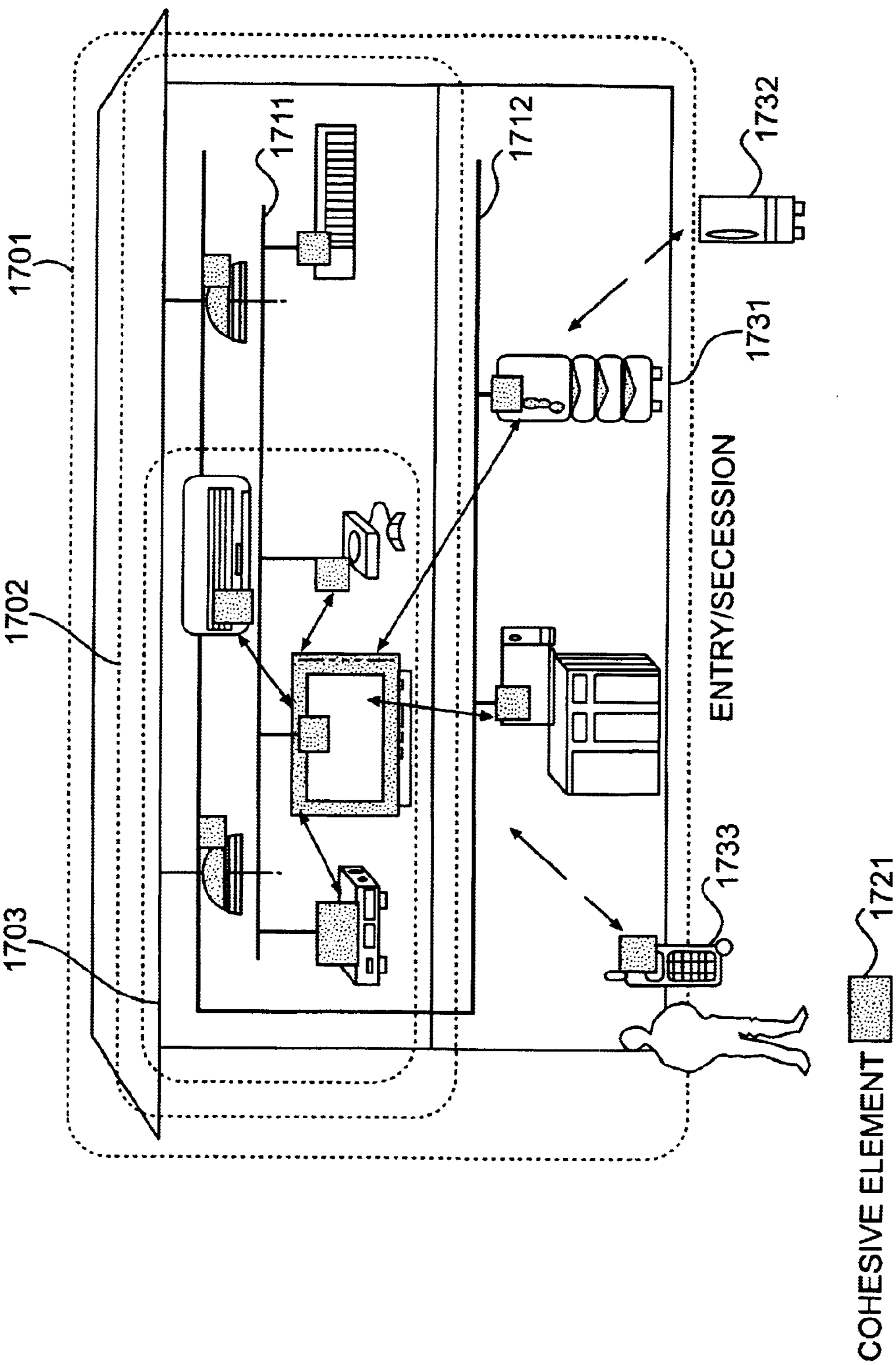
FIG. 17 is a diagram showing a configuration of a house system to which the present invention is applied.

FIG. 17 is a diagram showing a configuration of a house system to which the present invention is applied. The figure shows an example of a device system in a house. Devices in the house are each connected to one another using such communication media as a video media network 1711 and an AC power line network 1712. A device 1721 to which the present invention is applied is incorporated in or connected to each device in the house so that each device in the house can be linked beyond a range controlled by a computer. A range of linked devices can be determined based on physical bounds such as an entire house 1701, each floor 1702 (such as an entire second floor), or a specific room 1703. The range can also be determined based on each purpose such as power control or video/audio control. Further, the above two methods, that is, use of physical bounds and use of each purpose, may be combined to determine a range of linked devices. For example, a range may be determined for power-controlling a specific room. In this system, for example, a refrigerator 1731 is temporarily replaced with a refrigerator 1732 for maintenance or permanently replaced with a newly purchased refrigerator 1732.

Also, a portable telephone 1733 is moved around by its user. Since devices enter or leave a target environment as described above, devices included in a range of linked devices such as a house, a floor, or a room are dynamically changed.

Figure 25:
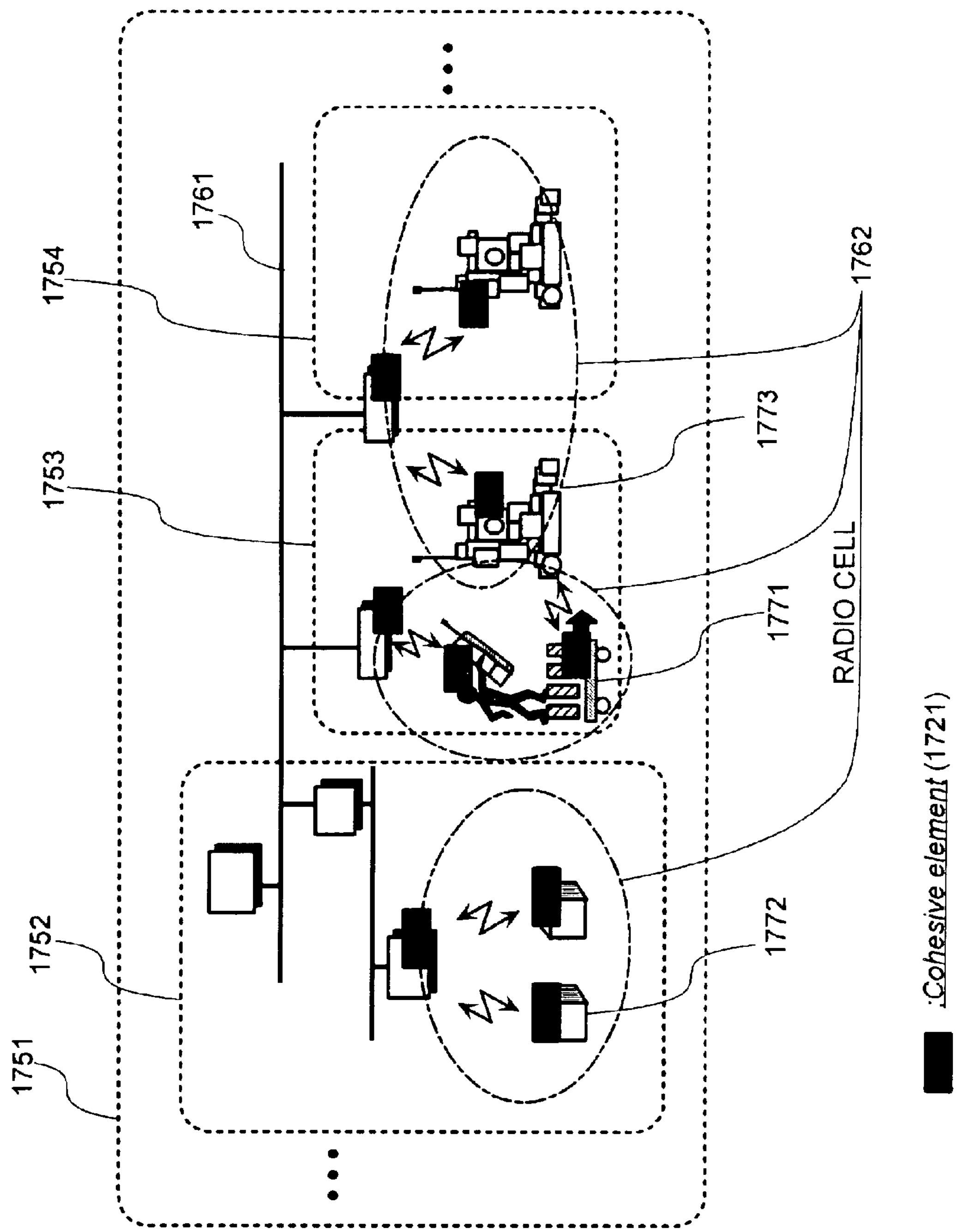
FIG. 25 is a diagram showing a control system configuration to which the present invention is applied.

FIG. 25 is a diagram showing a configuration of a control system to which the present invention is applied. In this system, structural components 1772 are carried by a conveying vehicle 1771 and processed by a processing machine 1773. A device 1721 to which the present invention is applied is incorporated in or connected to each piece of equipment. The pieces of equipment are each connected to one another through a local area network 1761 or an earth station controlling radio cells 1762. In this example, link ranges are formed based on physical and functional bounds, such as an entire factory 1751, a stock area 1752, an area 1753 for processing line 1, and an area 1754 for processing line 2. In this system, for example, the structural components 1772 enter and leave the stock area 1752 when they are conveyed, while the conveying vehicle 1771 repeatedly enters and leaves the stock area 1752, processing line 1, and processing line 2 in order to convey the structural components 1772. Furthermore, the positions and configurations of processing lines change as a result of reconstruction. Thus, facilities constituting the system dynamically change.

First Embodiment

Figures 2, 3:
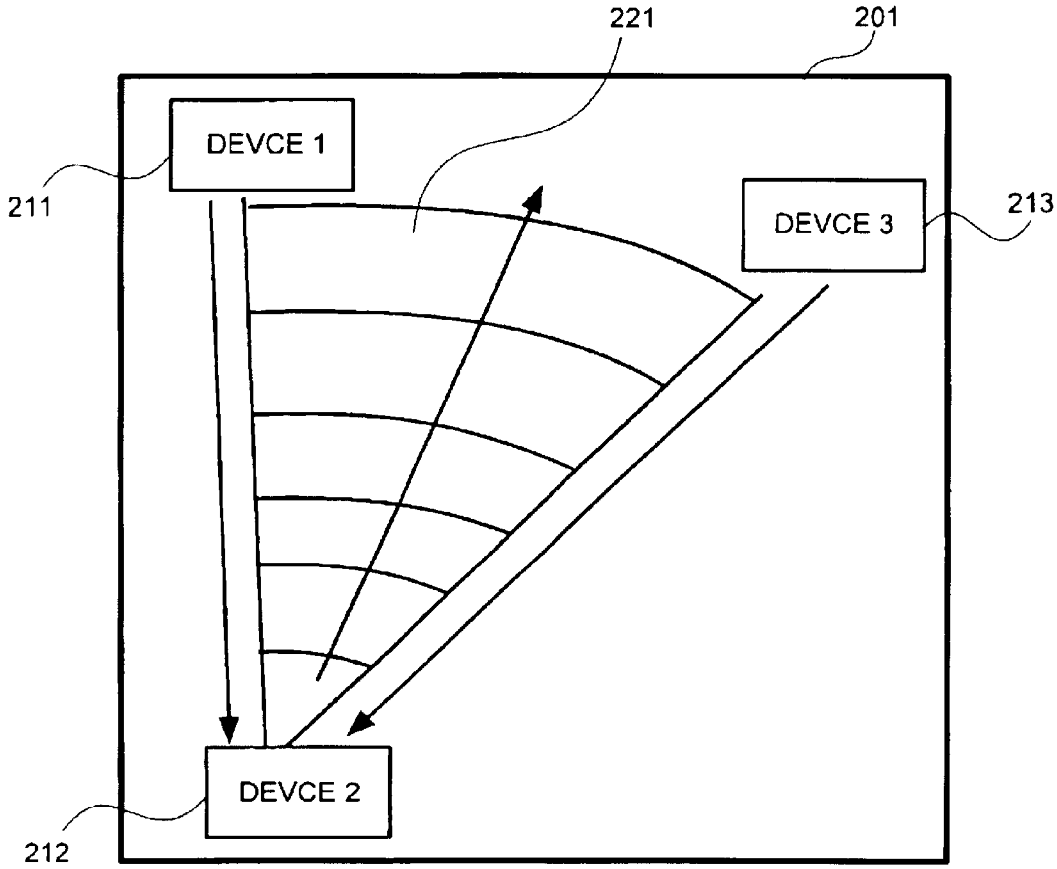
FIG. 2 is a diagram showing a system configuration of a first embodiment according to the present invention.
FIG. 3 is a diagram showing a structure of an environment information management table of the first embodiment according to the present invention.

FIG. 2 is a diagram showing a system configuration of a first embodiment according to the present invention. Devices 211 through 213 are placed in a room 201. Here, the device 212 transmits a presence inquiry signal 221 to surrounding devices through an optical communication such as one using infrared rays. The device 212 then receives responses from the devices 211 and 213, thereby recognizing their existence and positions. Since the walls of the room 201 shield these inquiry and response signals, devices recognized as surrounding devices are limited to those inside the room. When a radio communication is used instead of an infrared communication, walls having a shielding effect against radio waves can be used so as to recognize only devices inside the room as surrounding devices using the same method as that provided by this embodiment.

FIG. 3 is a diagram showing a structure of an environment information management table according to this embodiment. Each record is composed of a device name field 311, a device type field 312, a relative position filed 313, and an update time field 314. The device name field 311 stores the name of a recognized surrounding device. The relative position field 313 stores a relative position relationship between a device and a surrounding device. The update time field 314 stores the last time when a surrounding device registered in a record was recognized.

Figure 4:
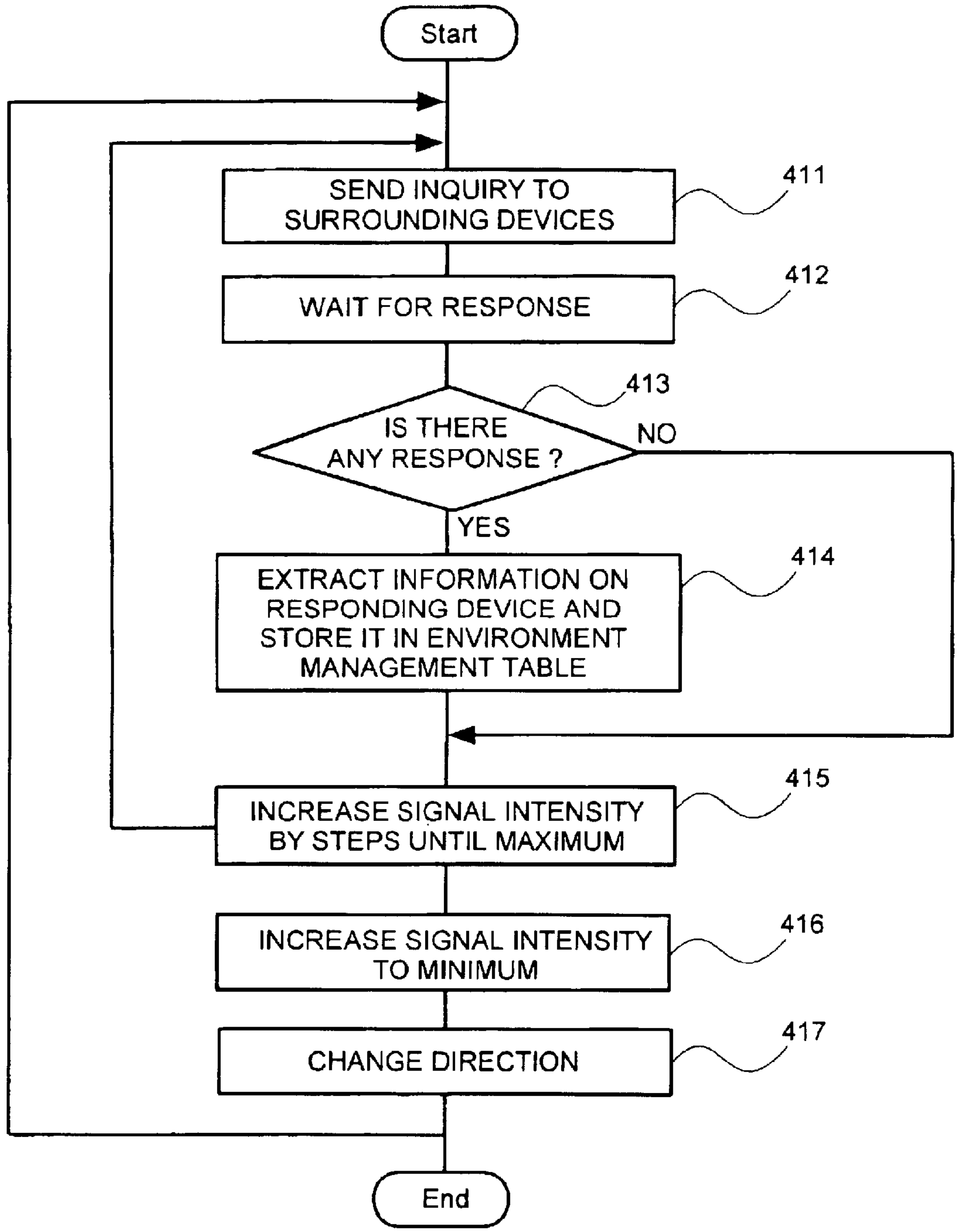
FIG. 4 is a flowchart showing environment recognition processing in which each surrounding device is detected according to the first embodiment of the present invention.

FIG. 4 is a flowchart showing environment recognition processing in which each device scans its surroundings to detect surrounding devices according to this embodiment. The environment recognition processing according to this embodiment takes the following steps. A device sends a presence inquiry signal to inquire whether any surrounding device exists through the sensor 131 at step 411, and waits for a response at step 412. At step 412, if the inquiring device receives a response from another device or there is no response during a predetermined period of time, the processing proceeds to the next step 413. Step 413 determines whether there is any response, and if there is any response, information on the responding device is stored in the environment management table 123 at step 414. Here, even when the responding device does not have a function to send its own information, only returning a mere response signal to the sensor, and therefore the inquiring device can only detect the presence of some device, the inquiring device assigns a unique device name to the responding device, and stores the device name in the device name field 311 as well as stores a relative distance calculated based on the direction of the responding device and the signal intensity, in the relative position field 313. If there is no response at step 413, the processing proceeds to step 415.

At step 415, the signal intensity of the sensor for detecting a surrounding device is increased, and steps 411 through 415 are repeated until the signal intensity reaches its maximum. Then, the signal intensity is decreased to its minimum at step 416, and the direction is changed at step 417 before repeating this processing from step 411. It should be noted that even though this embodiment illustrates an example in which surrounding devices are detected while changing the direction of a sensor, changing of the direction at step 415 is not necessary if an omnidirectional sensor is used. In this case, a distance from a surrounding device is stored in the relative position field 313.

Figure 35:
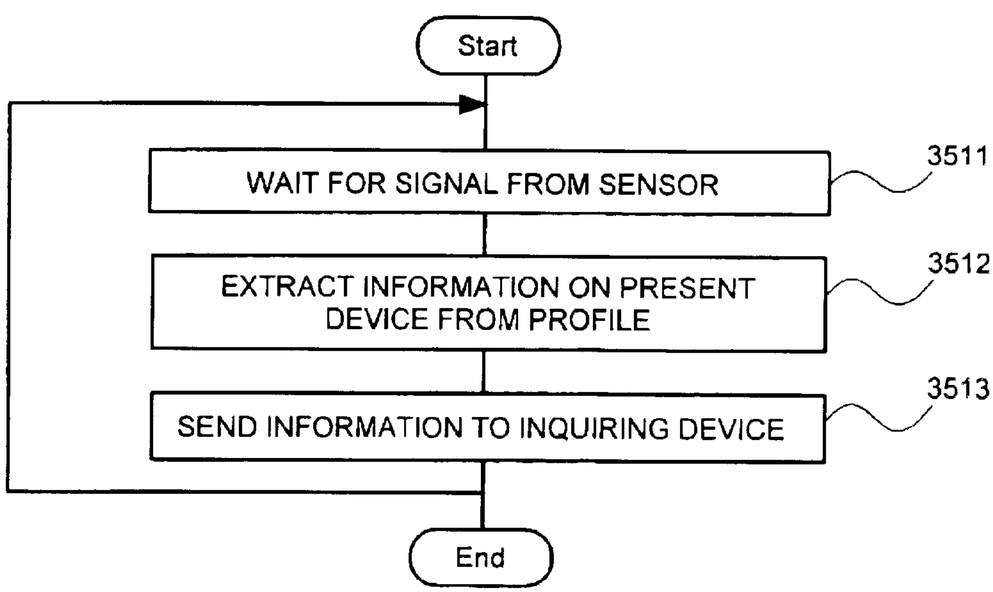
FIG. 35 is a flowchart showing a device information providing process included in link control processing according to the first embodiment of the present invention.

FIG. 35 is a flowchart showing a device information providing process included in environment recognition processing according to this embodiment. This process flow is performed to respond to an inquiry signal sent by the processing described in FIG. 4. This process takes the following steps. At step 3511, a device waits for a signal from its sensor, and when the device receives an inquiry signal from another device, the receiving device obtains its own name and type from its own profile 122 at step 3512, and sends them to the inquiring device at step 3513.

Figure 26:
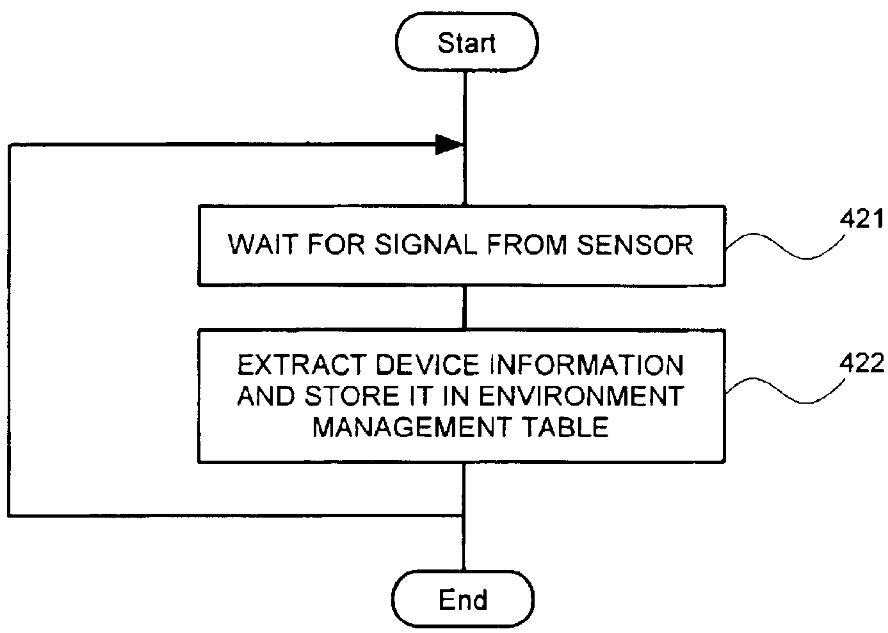
FIG. 26 is a flowchart showing environment recognition processing in which each device voluntarily sends its own device information according to the first embodiment of the present invention.

FIG. 26 is a flowchart showing environment recognition processing in which each device voluntarily sends its own device information according to this embodiment. This processing takes the following steps. At step 421, a device waits for a signal from its sensor, and from a received signal, the device extracts information on the sending device and stores it in the environment management table. Then, the processing returns to step 421.

According to this embodiment, without employing a means for globally detecting a device position and a relative distance between devices, each device can recognize a relative position relationship between devices. By utilizing obtained relative positions after converting them into addresses by controlling the signal intensity and the direction, it is easy to detect surrounding devices within a limited range such as within a room within which the reach of signals is limited, at a certain distance (certain signal intensity) from a device, within a certain distance, or outside a certain distance. That is, it is possible to determine link target devices without setting unique addresses across the entire system. Also, devices can recognize each other without installing a dedicated server.

Second Embodiment

According to a second embodiment of the present invention, as described below, information on surrounding devices are shared and used to recognize a link target device.

Figure 5:
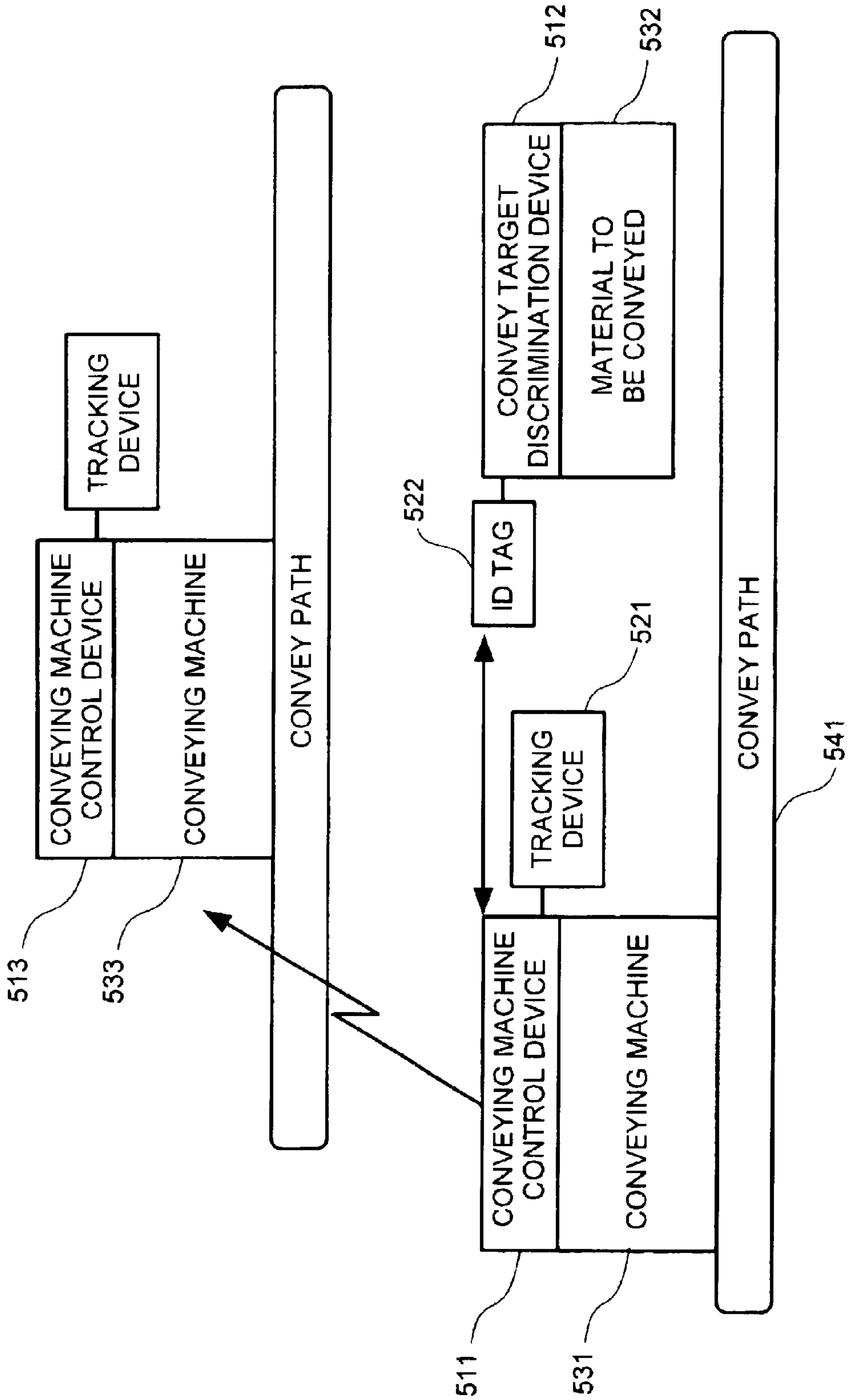
FIG. 5 is a diagram showing the system configuration of a second embodiment according to the present invention.

FIG. 5 is a diagram showing the system configuration of the second embodiment according to the present invention. A conveying machine 531 moves on a convey path 541 to carry a material 532 to be conveyed. The conveying machine 531 is provided with a conveying machine control device 511, which is an embodiment according to the present invention. The conveying machine control device 511 employs a tracking device 521 as the sensor 131 for obtaining environmental information in order to measure a position on the convey path. Furthermore, the material 532 to be conveyed is provided with a convey target discrimination device 512, which is also embodied according to the present invention, and which employs an ID tag 522 as the sensor 131 for obtaining environmental information. Here, the ID tag 522 has no sensing function and can only store information therein. However, when installing the ID tag, the conveying machine can write current position information in the ID tag so as to use the ID tag as if it functioned as a position sensor. The conveying machine control device 511 has a radio-communication function to read and write ID tag information for a material to be conveyed existing within a certain distance. The conveying machine control device 511 can also communicate with a conveying machine control device 513 mounted on another conveying machine 533 within a certain distance. These radio communications may be temporarily interrupted due to influence of an obstructive object or noise.

FIG. 6 is a diagram showing a structure of map information 121 held by the conveying machine control device 511. Each record is composed of a route number field 611, a "point (From)" field 612, an "absolute position (From)" field 613, a "point (To)" field 614, and an "absolute position (To)" field 615. Each record indicates a point and a direction on a convey path on which a conveying machine can be moved, and is identified by its route number. The "point (From)" is a start point on the convey path, while the "absolute position (From)" field stores the absolute position of "the point (From)". The "point (To)" is a destination point on the convey path, while the "absolute position (To)" field stores the absolute position of the "point (To)".

Figure 27:
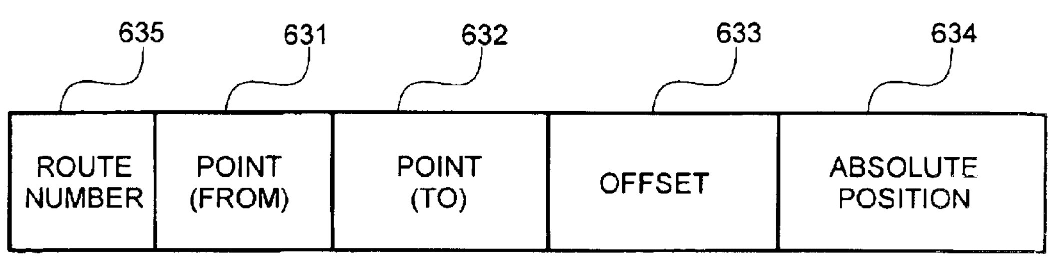
FIG. 27 is a diagram showing a structure of current position information according to the second embodiment of the present invention.

FIG. 27 is a diagram showing a structure of current position information held by the convey target discrimination device 512 and the conveying machine control device 511. Each piece of current position information includes a route number 635, which indicates a section in which a conveying machine or a material to be conveyed is currently present, a "point (From)" 631 and a "point (To)" 632, which are the nearest points to the current section, an offset 633, which is the offset of a current position from the "point (From)", and an absolute position. The conveying machine control device 511 obtains and stores current position information from the tracking device 512, while the convey target discrimination device 512 obtains and stores current position information from a conveying machine that carried the device.

Figure 7:
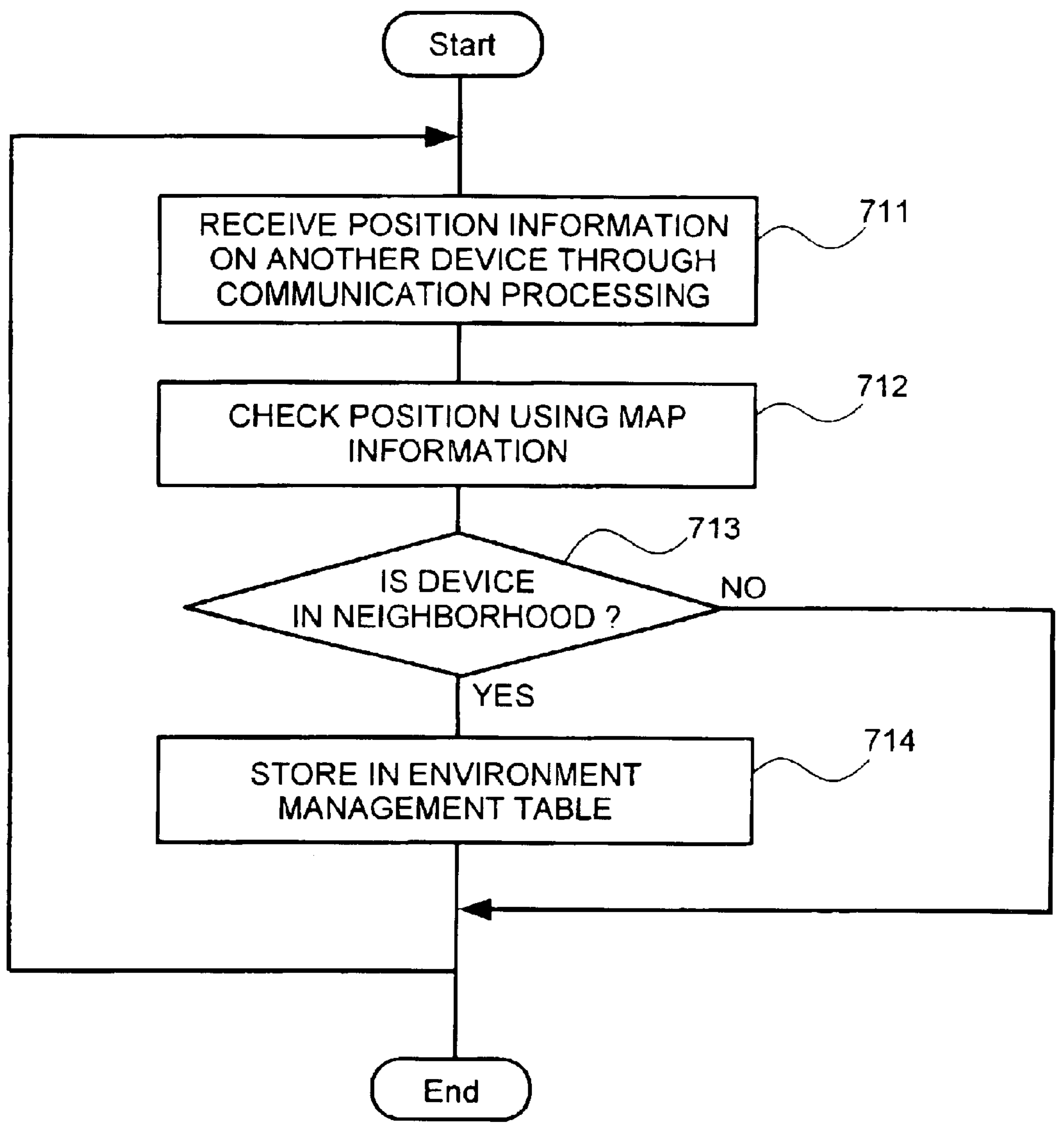
FIG. 7 is a flowchart showing environment recognition processing in which each surrounding device is detected, according to the second embodiment of the present invention.

FIG. 7 is a flowchart showing environment recognition processing in which surrounding devices are detected, according to this embodiment. The environment recognition processing according to this embodiment takes the following steps. A device receives device information and position information sent from another device through the communication processing 112 at step 711, and checks the information using the map information 121 held by the receiving device itself at stet 712. At step 712, the receiving device recognizes its own position and the position of the sending device on the map, and at step 713, the receiving device determines whether the sending device is in its neighborhood. Here, what a device's neighborhood specifically means is indicated by the following examples: On the conveying machine side of this embodiment, if a conveying machine finds a device in a section having the same route number as that of the current position of the machine, the conveying machine determines that the device is in its neighborhood. In the case where an ID tag or the like which can be used only within a limited transmission/reception range is employed, when a device receives information sent from another device, the receiving device can determine that the sending device is in its neighborhood. When the sending device is in the neighborhood of the receiving device at step 713, the receiving device stores device information and position information on the sending device in its environment management table at step 714. It should be noted that a device can update device information on another device which was registered as its surrounding device in the environment management table but is no longer an actual surrounding device since the center device has moved. This is done by, for example, periodically checking the update time field 314 of each stored record, and deleting device information which has not been updated for a predetermined period of time.

Figure 28:
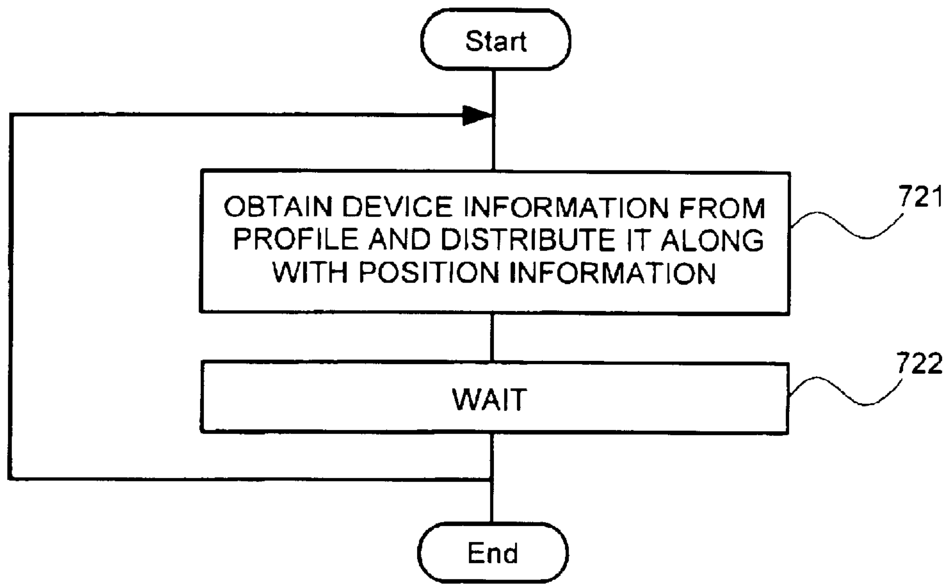
FIG. 28 is a flowchart showing a device information/position information distributing process included in environment recognition processing according to the second embodiment of the present invention.

FIG. 28 is a flowchart showing a device information/position information distributing process included in environment recognition processing according to this embodiment. This process takes the following steps. A device obtains its own device name 311 and device type 312 from its profile, and distributes them along with position information acquired from the sensor 131 through communication processing at step 721. Then, the device waits for a predetermined period of time at step 722 before the process is repeated from step 721. When an ID tag, which does not have any power source and thereby cannot transmit information on its own, is singly used, on the other hand, device information and position information may be sent in link with an event in which a charge wave is sent from an ID tag read/write device.

Figure 29:
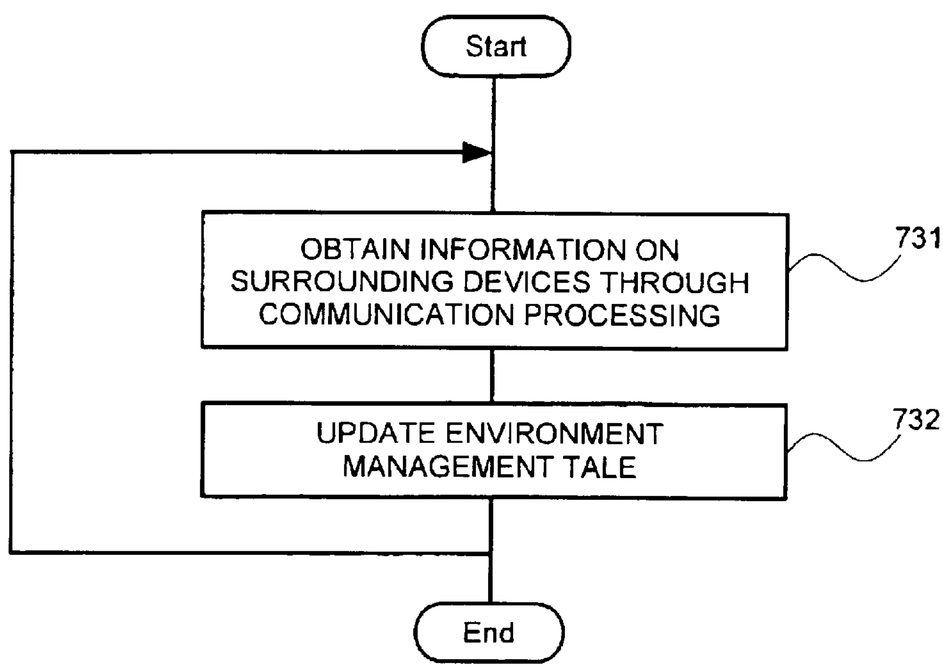
FIG. 29 is a flowchart showing a surrounding device information sharing process included in environment recognition processing according to the second embodiment of the present invention.

FIG. 29 is a flowchart showing a surrounding device information sharing process included in environment recognition processing according to this embodiment. The environment management table owned by each device is sent to other devices, periodically or at the timing of its update by broadcasting it via communication media. The following process is performed by a receiving device and takes the following steps. A device receives an environment management table storing surrounding device information owned and sent by another device through the communication processing at step 731, and then the receiving device compares it with its own environment management table to update its own environment management table at step 732.

Even though convey paths for conveying machines are used as map information in this embodiment, a position detection mechanism such as GPS (Global Positioning System) may be used. Furthermore, an apparatus employing such a system as a car navigation system may be used to detect a position on a map.

According to this embodiment, each device can send position information on its own, and receive position information sent from other devices so as to determine the relative position of each device using the obtained position information. Therefore, each device can recognize relative position relationships between devices to recognize a link target device without installing a dedicated server. Furthermore, even when linked devices or link target devices are moved from each other, or no link target device has been determined, it is possible to recognize or determine a linked device or a link target device suitably according to current conditions.

In addition, a device can send information on surrounding devices it recognized to other devices via available communication media so that a receiving device, including a device having no function to send position information on its own, which has received the surrounding device information can correct its surrounding device information that it was not able to detect properly due to a communication fault, or can detect or update information on devices which have been moved.

Third Embodiment

According to a third embodiment of the present invention, as described below, links between devices are dynamically controlled by utilizing functional information and conditional information owned by each device.

FIG. 8(*a*) is a diagram showing a structure of a device information storage table included in a profile 122. A device information storage table is composed of a device name field 811, a device type field 812, and a specifications field 813. The device name field 811 stores a unique name identifying a device, and the name is used as a destination address in communication processing. The device type field 812 stores a device type such as a conveying machine or a television set as supplemental information. The specifications field 813 stores device specifications such as a device model and performance.

FIG. 8(*b*) is a diagram showing a structure of a process configuration storage table included in the profile 122, storing each process which can be linked to a process of another device. Each record is composed of a process name field 821, an input interface field 822, an output interface field 823, a specifications field 824, and a status field 825. The process name field 821 stores a name identifying each process in a device. The external interfaces of each process are stored in the input interface field 822 and the output interface field 823. The input interface 822 is used to supply a command or data from an external process to an internal process.

The output interface 823 is used to supply a command or data from an internal process to an external process. These interfaces can be specified by use of an IDL (Interface Definition Language) to define and identify their interface names and arguments. Specifications of each process are written in the specifications field 824. By using an XML (extensible Markup Language), for example, structured complex information can be stored in this field. The status field 825 stores information on the state of each process including abnormality, a fault in a control target device of a process, and a heavy load condition, and, in addition, the field stores connection condition information such as a connected device, a connected process, and a connected state or a disconnected state. The link control processing 113 also utilizes this information to determine whether a device should be linked to another device.

Description will be made of schematic data flows between processes according to this embodiment.

Figure 14:
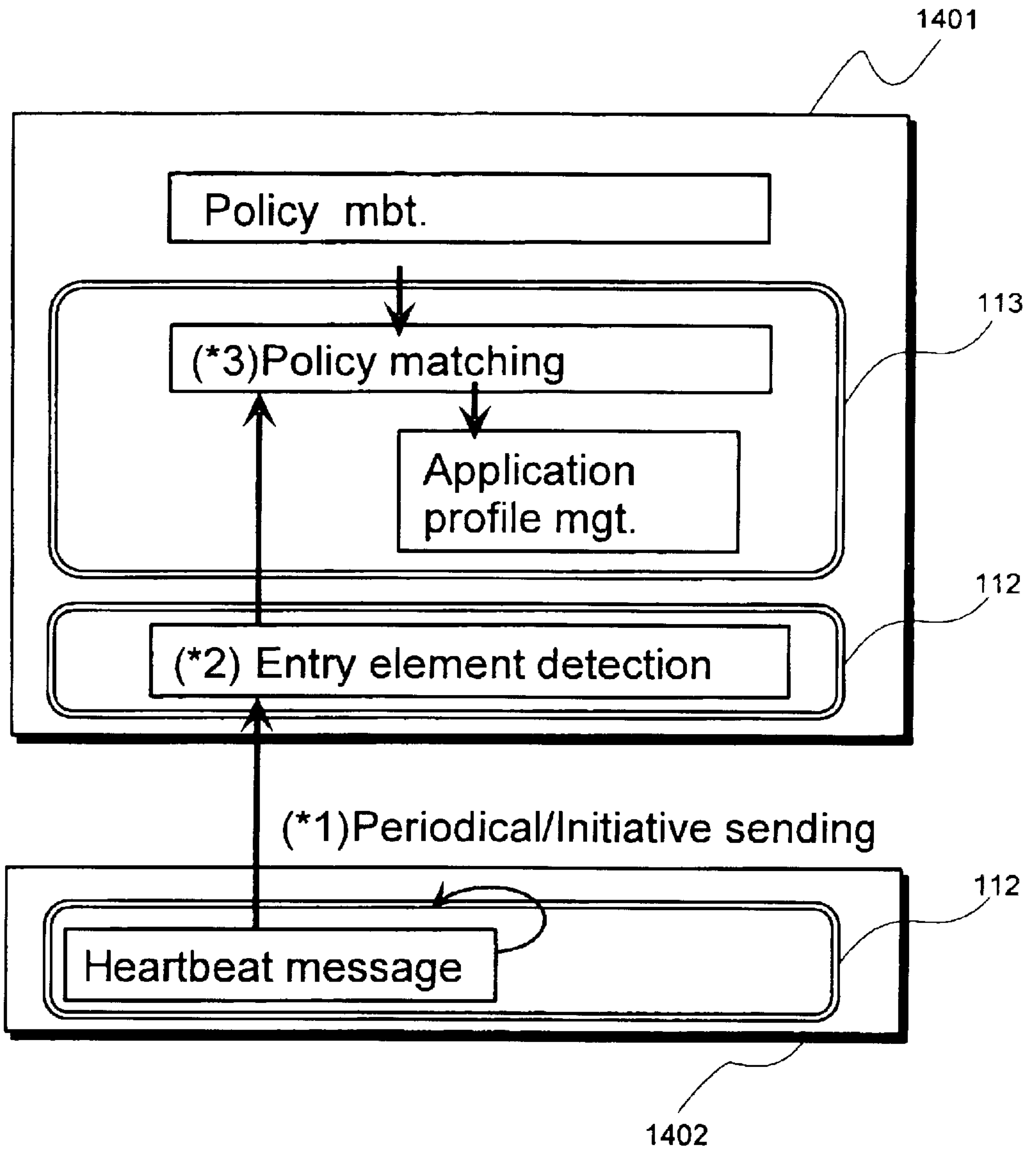
FIG. 14 is a diagram showing a data flow between processes in which a device entering the system is detected, according to the third embodiment of the present invention.

FIG. 14 is a diagram showing a data flow between processes in which a device entering the system is detected, according to this embodiment. In the figure, a device 1402 enters the system and a device 1401 detects it. While the device 1402 transmits a heartbeat message periodically and voluntarily through its communication processing 112 (*1), the device 1401 receives this heartbeat message through its communication processing 112 and determines whether or not the device 1401 has already received a heartbeat message from the device which is transmitting the current heartbeat message. If not, this means that the device transmitting the heartbeat message has newly entered the system (*2). The heartbeat message includes an identifier specifying the device 1402 and the transmission interval. When the device transmitting the heartbeat message is a newly detected device, the device 1401 performs a policy matching with the device 1402, through the link control processing 113 (*3), and if the device 1402 is suitable as a link target device, the process proceeds to an application profile matching process.

Figure 30:
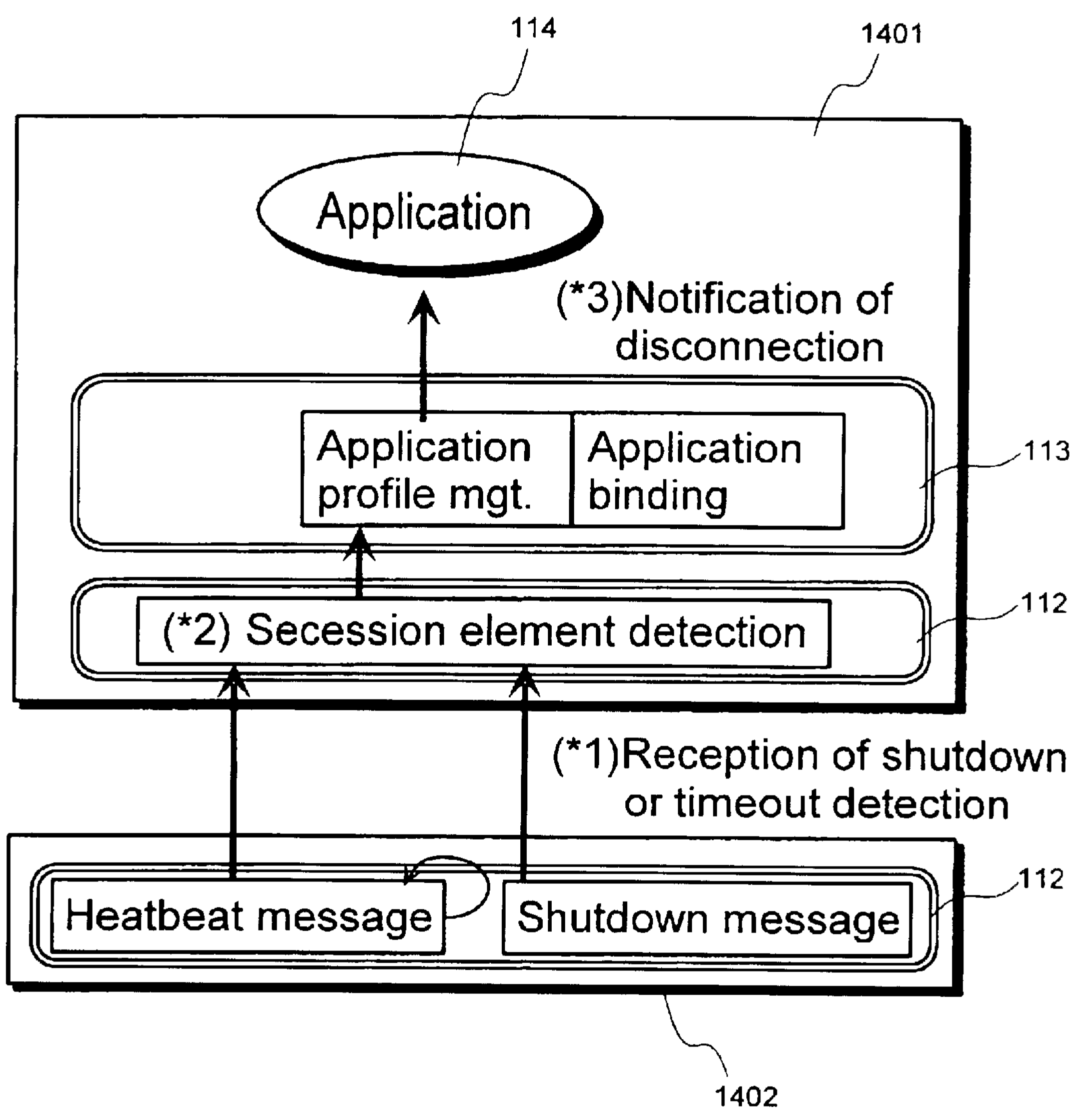
FIG. 30 is a diagram showing a data flow between processes in which a device leaving the system is detected according to the third embodiment of the present invention.

FIG. 30 is a diagram showing a data flow between processes in which a device leaving the system is detected 1, according to this embodiment. In the figure, a device 1402 leaves the system and a device 1401 detects it. The device 1402 transmits a shutdown message at the time of leaving the system (*1), and the device 1401 receives this message through communication processing, thereby detecting the device 1402 leaving. On the other hand, when the device 1401 cannot receive a heartbeat message periodically sent from the device 1402 for a predetermined period of time proportional to the interval of the heartbeat message, the device 1401 detects that the device 1402 has left the system, through time-out processing (*2). After detecting that the device 1402 has left, if there is a processing program 114 linked to a processing program of the device 1402 which has already left, the device 1401 performs termination processing on the processing program 114 through the link control processing 113(*3).

Figure 15:
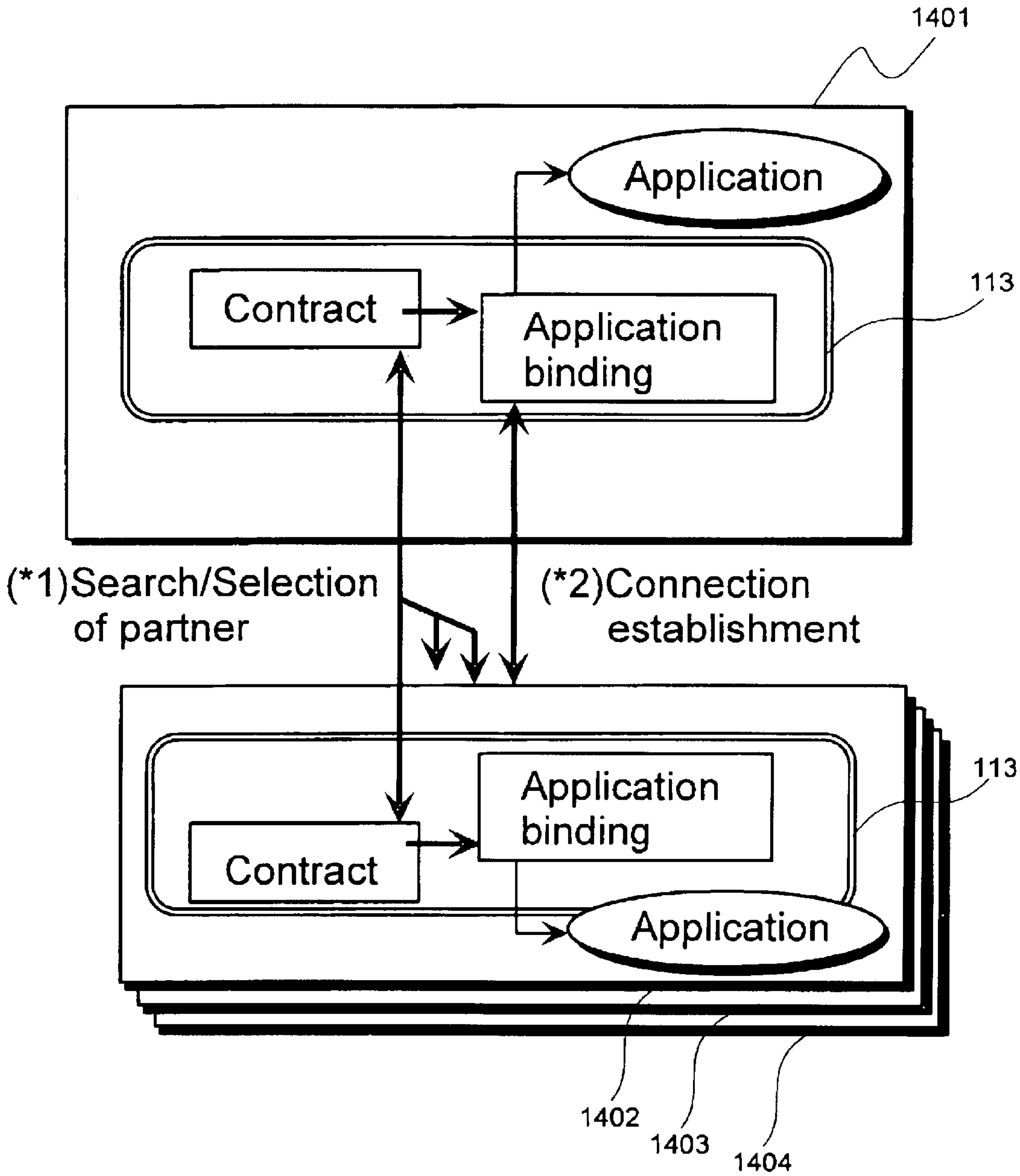
FIG. 15 is a diagram showing a data flow between processes in which processing programs of devices are linked according to the third embodiment of the present invention.

FIG. 15 is a diagram showing a data flow between processes in which processing programs of devices are linked according to this embodiment. To link its processing programs with processing programs in the device 1402 after recognizing the device 1402, the device 1401 obtains the configurations of the processing programs in the device 1402, and compares them with those of its own processing programs to select a matching one as a link target (*1). Alternatively, the device 1401 sends the configurations of its own processes to the device 1402 so that the device 1402 compares them with those of its own to see if there is any matching one as a link target. If there are a plurality of potential link target devices, such as devices 1403 and 1404 shown in FIG. 15, the same processing is performed for them. Then, the device 1401 establishes a connection with a device determined to be linked, and links a processing program of its own and a processing program of the connected device (*2).

Figure 31:
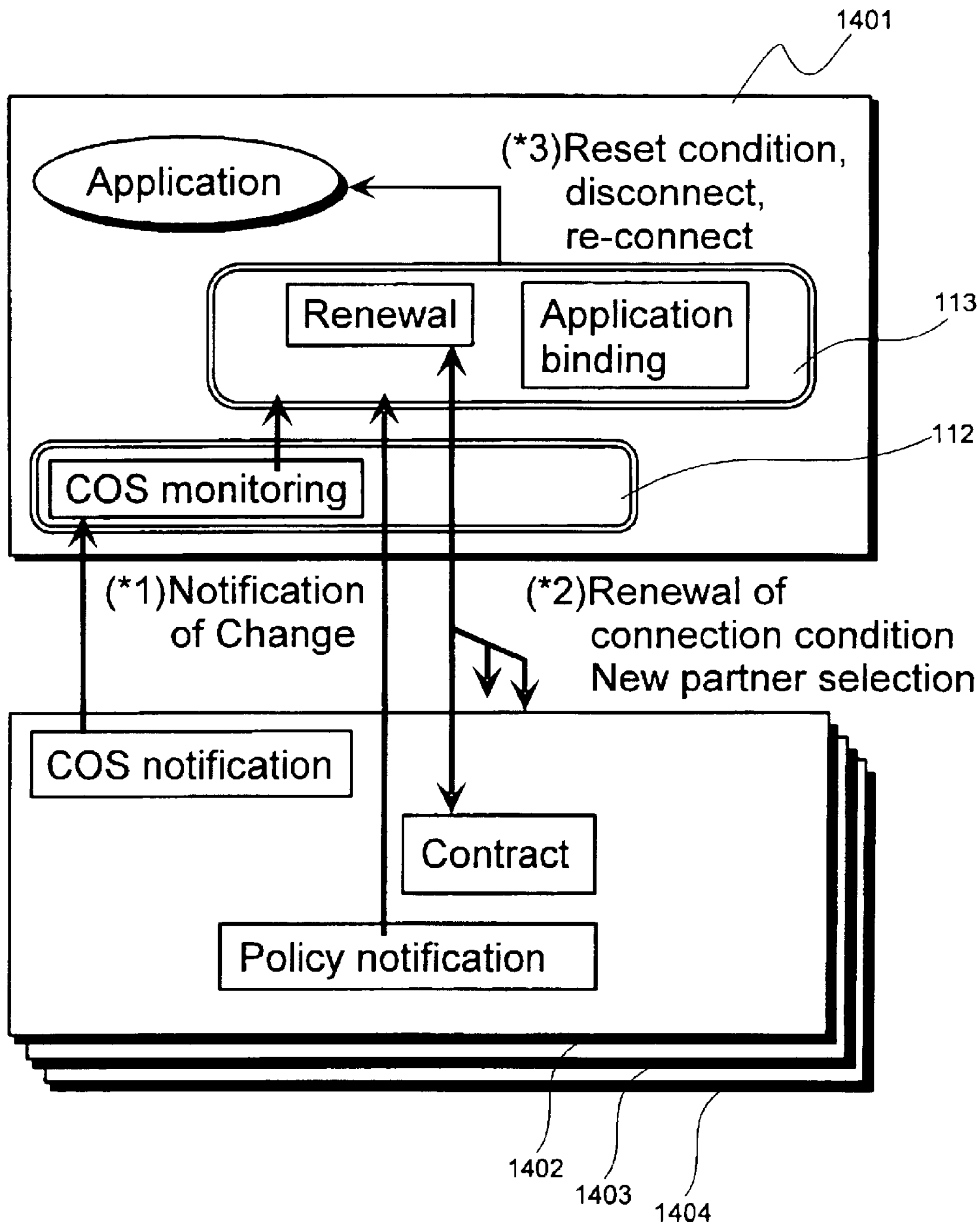
FIG. 31 is a diagram showing a data flow between processes in which links between processing programs of devices are updated according to the third embodiment of the present invention.

FIG. 31 is a diagram showing a data flow between processes in which links between the processing programs of devices are updated according to this embodiment. When a change occurs in its device conditions, the device 1402 sends a conditional change notice (*1), and the device 1401 receives this notice and determines whether links between processing programs should be updated (*1). The conditional change means that a change occurs in conditions previously checked at the time of forming a link; for example, occurrence of a fault in a processing program or a change in responsiveness. Furthermore, the device 1402 holds a policy specifying its device conditions such as loads and currently executable programs and non-executable programs, and when these conditions have changed, the device 1402 also sends a notice. If the device 1403 or 1404 has a processing program linked to that of the device 1401, it operates in the same way as the device 1402 does. Then, to form a link with another processing program, the device 1401 performs processing as described above using FIG. 15. To continue an existing link, the device 1401 also updates the link conditions (*2). At the time of the above change or update, the device 1401 notifies its own processing programs of the change or update so that they can perform processing such as updating of conditions, disconnection, or reconnection (*3).

Figure 16:
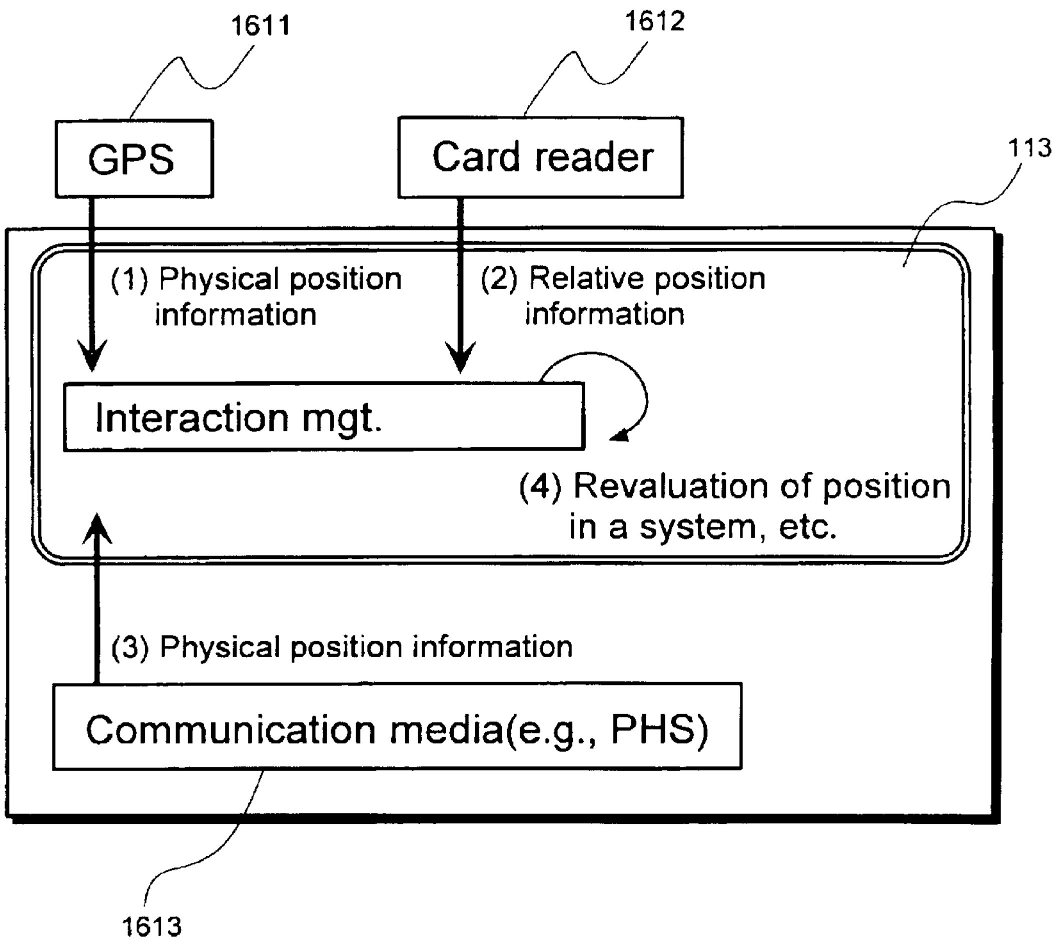
FIG. 16 is a diagram showing a data flow in which position information is obtained, according to the third embodiment of the present invention.

FIG. 16 is a diagram showing a data flow in which position information is obtained according to this embodiment. A GPS sensor 1611 may be used as the sensor 131 for the environment recognition processing 111 to obtain absolute position information and position information on a map as described in the second embodiment.

In the case where a card reader 1612 is used, relative position information to the card at the time of reading the card can be obtained by using information read from the card. Furthermore, when a communication medium such as PHS which provides position information is used, it is possible to obtain position information without installing a sensor for that purpose (*3). A device constantly updates its position in a system based on information of its own and position information on other devices obtained as described above (*4).

Figure 9:
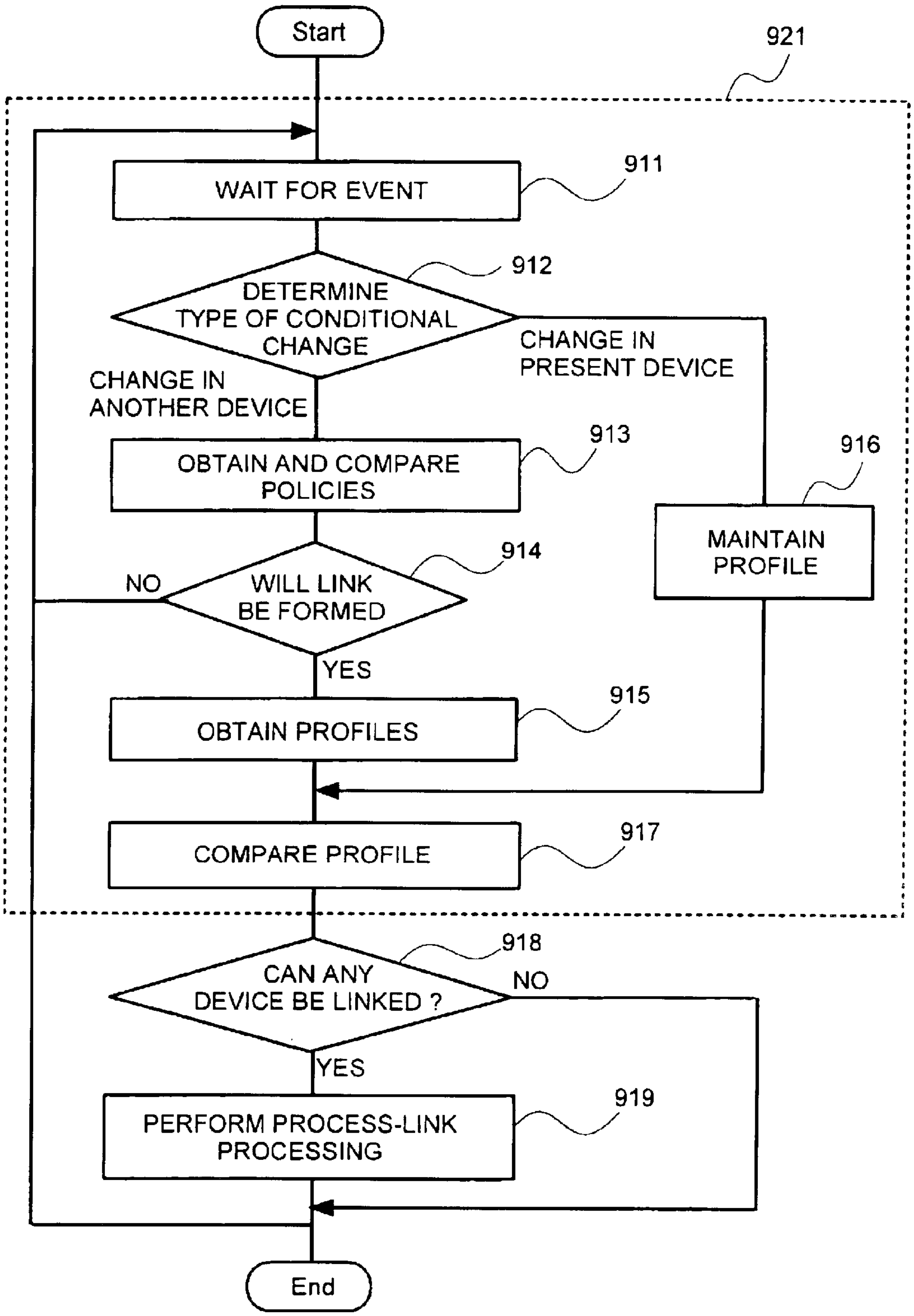
FIG. 9 is a flowchart showing a matching process in link control processing according to the third embodiment of the present invention.

FIG. 9 is a flowchart showing a matching process in the link control processing 113 according to this embodiment. This process takes the following steps. A device waits for an event of a conditional change in its process or in another device to occur, at step 911, and, when the event occurs, determines what type of conditional change has occurred, at step 912. In the following description of this embodiment, process flows for two types of conditional changes are illustrated: a conditional change in the present (center) device and a conditional change in other (surrounding) devices. A conditional change in other devices means that a new surrounding device is detected through environment recognition processing 111, or a change occurs in an already detected device. A conditional change in the present device means a configurational or conditional change in a process in the present device, which can be detected by receiving a fault notice from a processing program 114 or monitoring notices from the operating system. Even though only the above conditional changes are described in this embodiment, a matching process can be performed for other changes which occur due to various events such as one in which a user explicitly specifies a change.

When a device detects a conditional change in another device at step 912, the device obtains a policy from the another device, and compares the policy with its own policy to determine whether to form or continue a link with the another device at step 914. When the device decides not to form a link, the process returns to step 911 and waits for an event to occur. When the device decides to form a link, it obtains the profile of the another device in which a change has occurred, from the another device itself, at step 915. It should be noted that the policy of each device used at step 913 and the profile of each device obtained at step 915 may be acquired by issuing an inquiry, or having each device periodically transmit them and receiving them. The policy and the profile may also be obtained using a method described in Japanese Patent Application No. 8-249611 (1996), in which each device transmits them only when a change has occurred in them, which will be then copied by a receiving device.

When a device detects a change in its own device conditions at step 912, the device updates its profile information at step 916. The profile of the device obtained at the above steps and the profile of another device are compared at step 917, and whether any processes can be linked is determined at step 918. According to this embodiment, whether or not two processes can be linked is determined by checking whether the output interface of one process coincides with the input interface of the other and status information 825 of each process indicates that the process is executable. If there are any processes which can be linked, a device stores the combination of the process pair in the dynamic link management table, and perform processing for linking processes so that the processes can transmit data to or receive data from each other, at step 919. The processing for linking processes binds two processes using a method in which, for example, the data-transmitting process obtains an object reference to the data-receiving process. When a fault occurs in one of the processes, the connection between the processes is disconnected.

Figure 32:
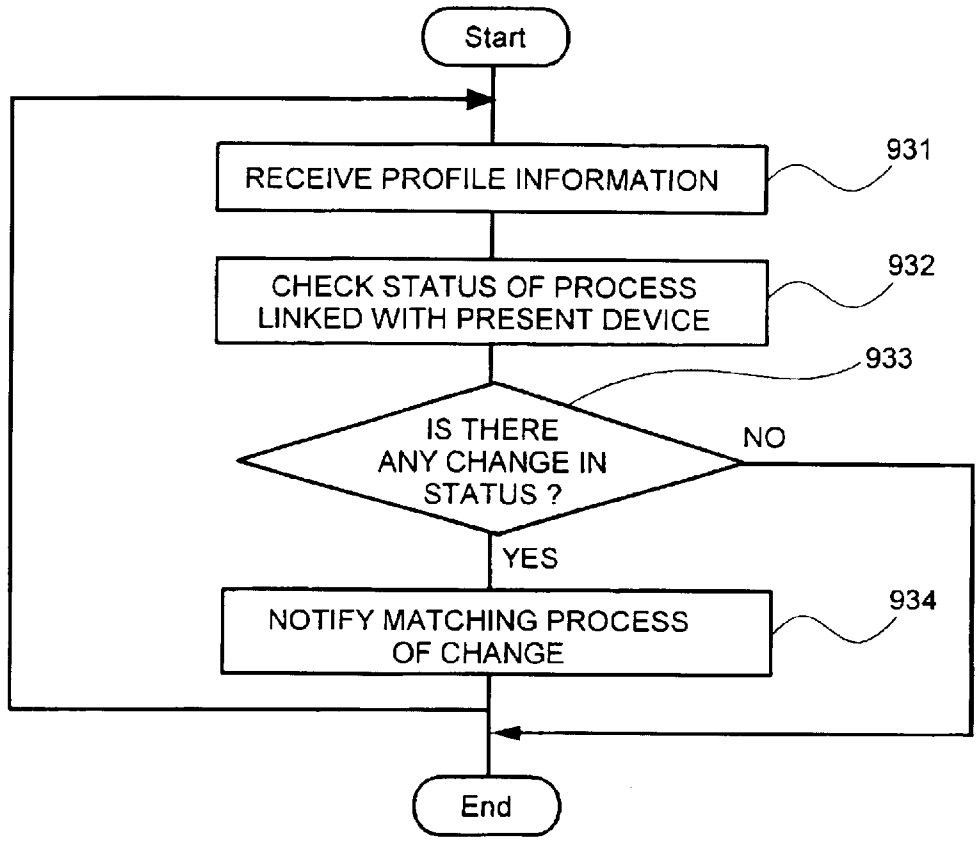
FIG. 32 is a flowchart showing a link condition monitoring process included in link control processing according to the third embodiment of the present invention.

FIG. 32 is a flowchart showing a link condition monitoring process included in the link control processing 113 according to this embodiment. The process takes the following steps. A device receives profile information periodically transmitted by each device at step 931, and checks the status of each linked process at step 932. The device determines whether a change has occurred in the conditions of each process linked with a process of its own at step 933, and when a change has occurred, the device notifies the matching process described in FIG. 9 of the change at step 934. A change in the conditions of a process, here, includes a fault in the process or detection of a process more suitable than the process when a process is to be selected from a plurality of devices or a plurality of processes as described in a fourth embodiment.

FIG. 19 is a diagram showing a structure of the dynamic link management table 125 according to this embodiment. Each record is composed of a purpose identifier field 1911, a link target field 1912, a "process name and interface name of present device" field 1913, and a link state field 1914. The purpose identifier field 1911 stores an identifier of a purpose for which processing programs are linked, and in this embodiment, stores a record number. The link target field 1912 stores the name of a linked device, the name of a linked process, and the name of the interface of the linked process. The "process name and interface name of present device" field 1913 stores the name of a linked process of the present device and its interface name. The link state field 1914 stores a link state between the processes registered in a record, and specifically stores a connection condition such as the "linked" state or the "unlinked" state and a performance value such as a processing response time.

Figure 21:
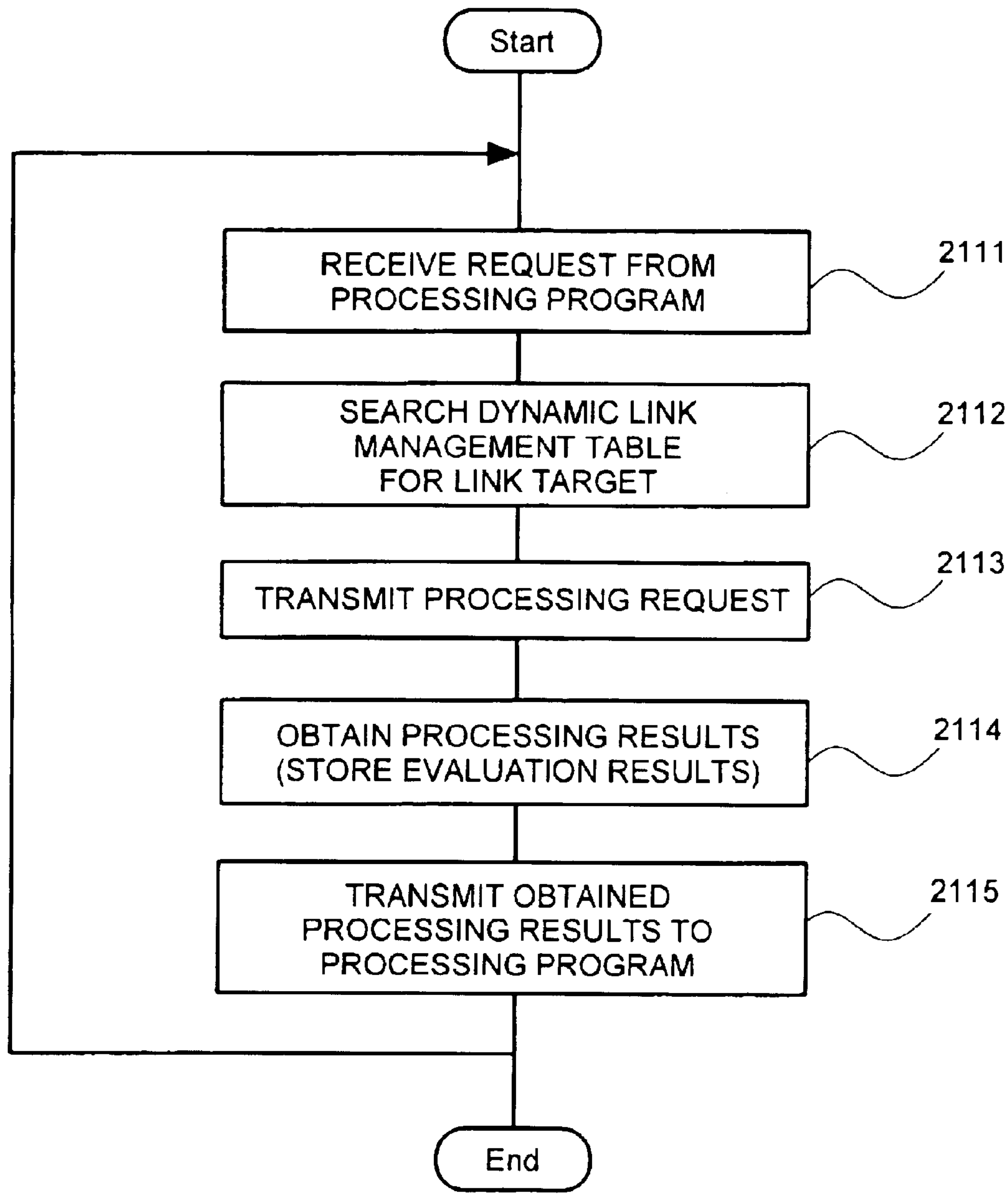
FIG. 21 is a flowchart showing a link target selection process included in link control processing according to the third embodiment of the present invention.

FIG. 21 is a flowchart showing a link target selection process included in the link control processing according to this embodiment. The process takes the following steps. A device receives a request from a processing program at step 2111, and then searches for a record corresponding to the processing program that has sent the request in order to select a link target which will perform the request at step 2112. As a link target, a surrounding device close to the device may be selected by obtaining the relative distances of surrounding devices from the environment management table, or all devices may be selected and allowed to perform processing without specifying any particular device. Then, the results of the above processing may be used for processing later requests, selecting a device which processes a request the fastest. For example, the processing responsiveness of a device changes depending on communication conditions and its load. To cope with this problem, a plurality of link targets can be employed, as described above, so that it is possible to flexibly form a link by selecting a device to be linked at run time. When a device or surrounding devices move, the device can select a nearest surrounding device as a link target during execution of a processing program. After the above step 2112, the device transmits a process request at step 2113, and then receives the processing results from another device which has processed the request at step 2114. When evaluation results are used for later selections of a link target, the device stores the evaluation results in the dynamic link management table. After the received processing results are supplied to the requesting processing program at step 2115, the process flow returns to step 2111 at which the process waits for a request from a processing program.

According to this embodiment, each device can form a link with another device by utilizing information on the environment in which it is placed and process information locally managed by each device so that devices each can locally perform a matching process with one another without installing a dedicated server. Furthermore, each device can continuously make a judgement as to whether to form a link or whether to continue an existing link using information on the conditions of processes of each device so as to flexibly control links with other devices even when a change occurs in the conditions of a linked device. In addition, a plurality of link targets can be employed from which to select one to be linked at run time, or to select a processing result from processing results provided by a plurality of link targets for more flexible link formation.

Fourth Embodiment

A fourth embodiment according to the present invention provides a method for determining surrounding devices and processes to be linked based on relative position information, which is a type of environment information, and conditions of devices. The method is described with reference to an example in which a relative position between devices and a time limit for a service are used to determine a link target device.

Figure 10:
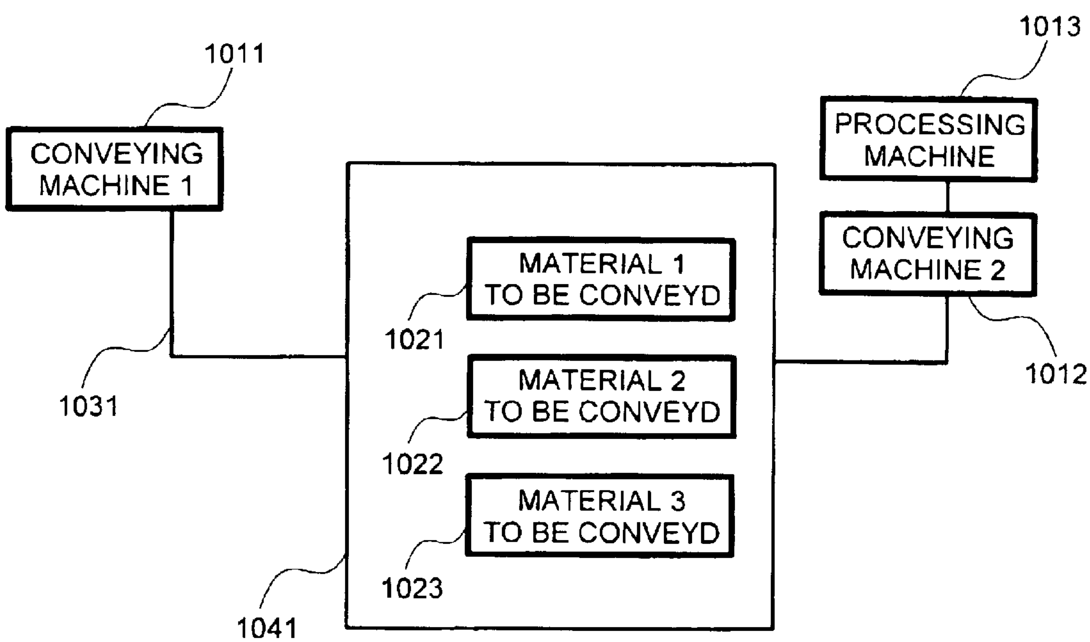
FIG. 10 is a diagram showing a system configuration of a fourth embodiment according to the present invention.

FIG. 10 is a diagram showing a system configuration according to this embodiment. A device according to the present invention is incorporated in or connected to conveying machines 1011 and 1012, materials 1021 through 1023 to be conveyed, and a processing machine 1013. The conveying machines 1011 and 1012 carry the materials 1021 through 1023 to be conveyed to a stock area 1041 through a convey path 1031 as well as carry the materials from the stock area 1041 to the processing machine 1013. Each conveying machine can carry only one material to be conveyed at the same time. Here, there is a time limit for each of the materials 1021 through 1023 to be processed by the processing machine 1013 after it is placed in the stock area 1041.

FIG. 11(*a*) is a diagram showing a structure of a present device condition storage table included in the policy 124 according to this embodiment. A "current conditions of present device" field 1111 stores the current conditions of the present device according to processing results of the processing programs 114. Here, the conditions of the present device mean the operating states or states of each machine or material, and are indicated by the following words or phrases: "conveying", "empty", and "reserved" for a conveying machine; and "being conveyed", "in stock area", "remaining time until time limit", and "being processed for a material to be conveyed.

FIG. 11(*b*) is a diagram showing a structure of an authenticated device table included in the policy 124 according to this embodiment. Each record is composed of a "link target device names field 1121 and a "link target device type" field 1122. The "link target device name" field 1121 stores the name of a device which can be linked, and the "link target device type" field 1122 stores the type of a device which can be linked. Specifically, in this embodiment, the "link target device type" field 1122 stores an identifier indicating each machine type such as a conveying machine or a processing machine, or a material itself. A record whose "link target device name" field 1121 is empty and whose "link target device type" field 1122 stores some value denoting a device type indicates that all devices of this type can be linked. This table is used in the policy acquisition and comparison process 913 included in the link control processing 113 described in the third embodiment according to the present invention.

FIG. 11(*c*) is a diagram showing a structure of a matching table included in the policy 124 according to this embodiment. Each record indicates a matching condition and is composed of a "conditions of present device" field 1131, a priority field 1132, a "link target device name/type" field 1133, a "link target device conditions" field 1134 and a "link target device selection condition" field 1135. The "conditions of present device" field 1131 of a record is compared with the current conditions of present device" field 1111 to determine whether to perform a matching process using this record. The "link target device name/type" field 1133 stores the name or type of a device to be linked, while the "link target device conditions" field 1134 stores the conditions of a device to be linked. The priority field 1132 stores a number indicating the priority of each record, that is, the priority of the matching condition included in each record, when there are plurality of records having the same value in the conditions of present device" field 1131. The "link target device selection condition" field 1135 stores conditions used to select the number of devices to be linked or a device to be linked itself when there are a plurality of link target devices.

The number of devices to be linked may be one or a maximum of two. To select a device to be linked, a device which can be linked first or a device at a shortest relative distance may be given priority.

Figure 12:
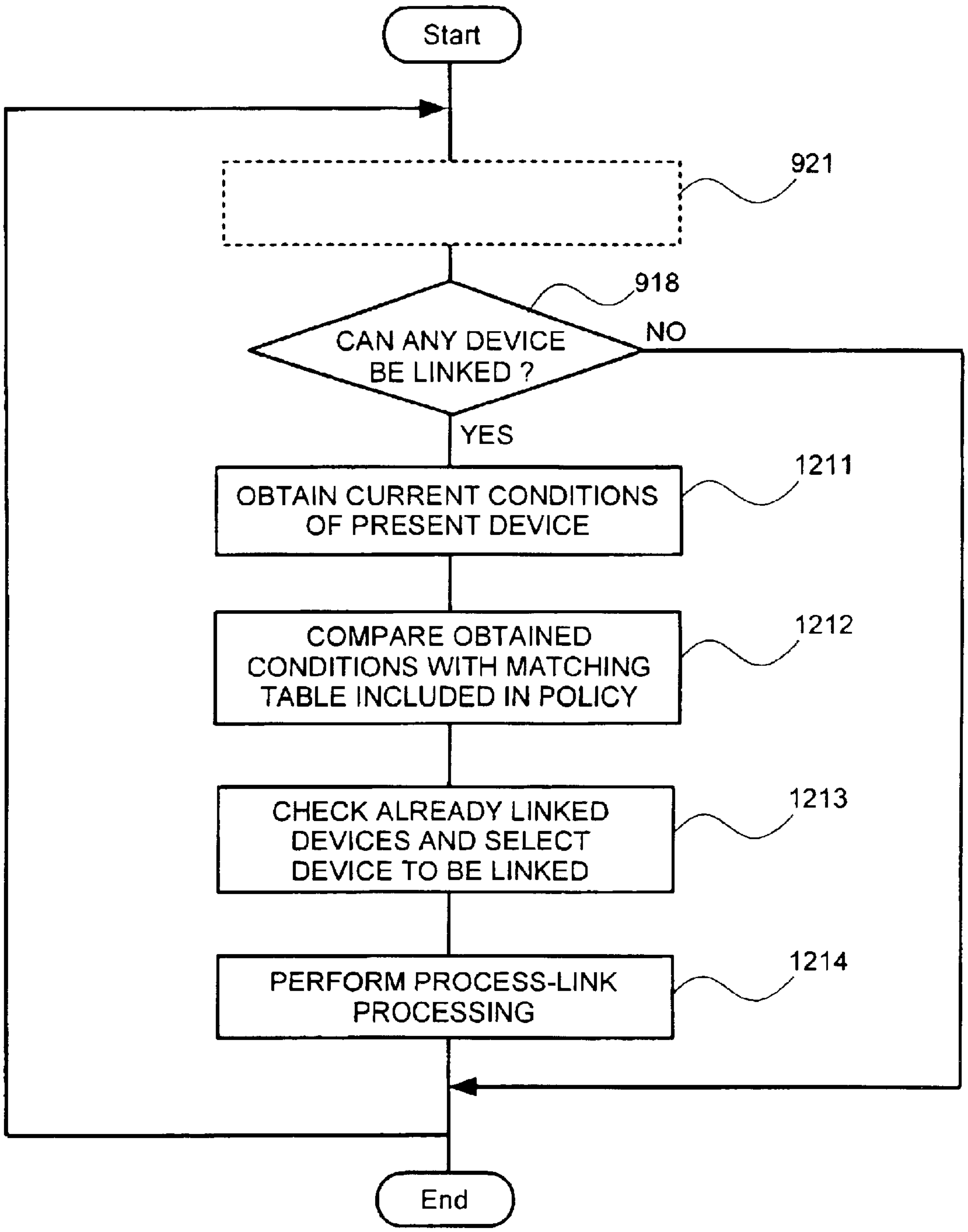
FIG. 12 is a flowchart showing a matching process in link control processing according to the fourth embodiment of the present invention.

FIG. 12 is a flowchart showing a matching process included in the link control processing 113 according to this embodiment. A process 921 takes the same flow of steps as that described in the third embodiment, including event detection, determination of the type of the event detected (for the present device or for another device), and comparison of policies when the event is related to another device. A change in the conditions of another device in this embodiment includes a change (and as a result, occurrence of an event) in the current conditions of each device described using FIG. 11(*a*). When the event is related to another device, the present device obtains the profile of the another device and compares it with its own profile at steps 911 through 917. As a result of the comparison, if it is determined at step 918 that the another device can be linked, the present device obtains its own current conditions from the policy 124 at step 1211, and compares the conditions of the another device in which the event has occurred, against the matching table included in the policy described using FIG. 11(*c*), at step 1212. If the another device satisfies the matching conditions, the present device compares it with already linked devices to determine whether to change link targets at step 1213. This comparison of link target devices is performed by referring to the "link target device selection condition" field 1135 of the matching table in the policy.

The present device determines whether to add a device to be linked or whether to change an existing link based on the link target device selection condition. If it is determined that a process of a device should be newly bound or changed, the present device terminates the existing connection and establishes a new connection with a selected process.

Incidentally, in this embodiment, description was made of an example in which a process is activated by an event for the present device or another device. Events for the present device or other devices may be stored and processing of these events may be performed later, periodically. Furthermore, in this embodiment, the present device determines whether to change a link each time a change in another device is detected. However, the present device may wait for a plurality of events in a plurality of devices to occur until it makes any judgement.

Figure 33:
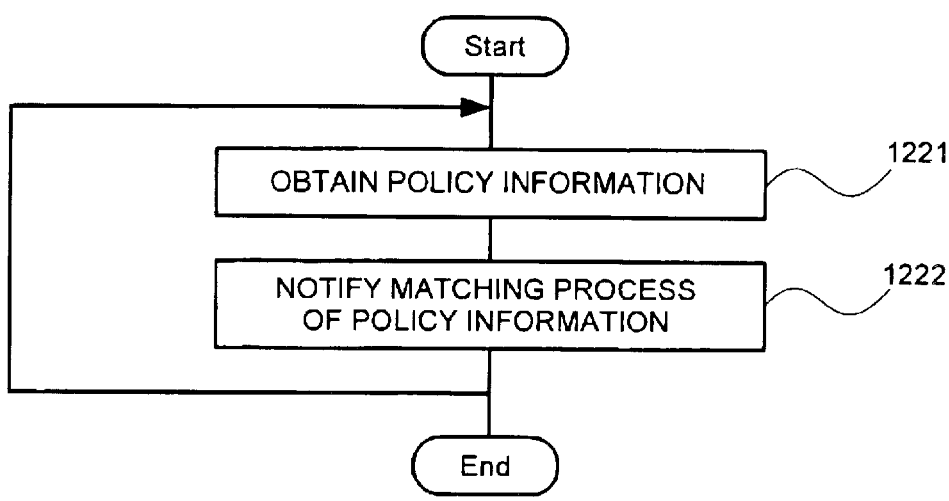
FIG. 33 is a flowchart showing a policy receiving process included in link control processing according to the fourth embodiment of the present invention.

FIG. 33 is a flowchart showing a policy receiving process included in the link control processing 113 according to this embodiment. A device receives policy information transmitted by each device periodically or each time a change occurs in conditions, and obtains the current conditions of each device at step 1221. The device informs the current conditions of each device to the matching process described using FIG. 12 at step 1222.

Figure 13:
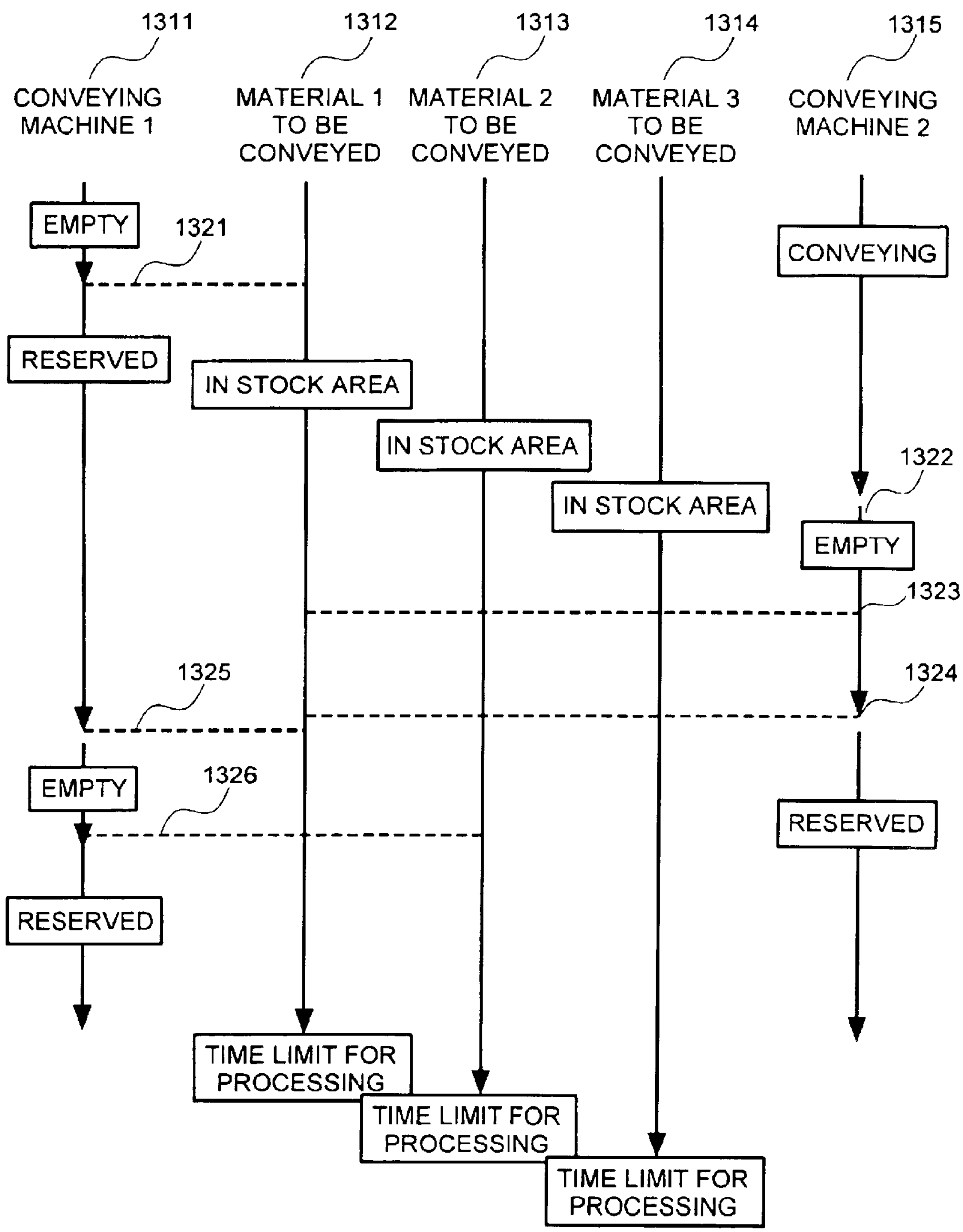
FIG. 13 is a time chart showing changes in conditions of each device according to the fourth embodiment of the present invention.

FIG. 13 shows time charts showing changes in conditions of each device according to this embodiment. Time charts 1311 through 1315 show transitions of the conditions of a conveying machine 1, materials 1 through 3 to be conveyed, and a conveying machine 2, respectively, and time elapses from top to bottom. The material 1 to be conveyed reserves the conveying machine 1 which is not currently used, at step 1321. To make the reservation, a processing program 114 of the conveying machine 1 linked with the material 1 to be conveyed updates the "current conditions of present device" field in the policy 124 of the conveying machine to indicate the "reserved" state. After that, the conveying machine 2 finishes conveying a material to the processing machine and becomes in the "empty" state at step 1322. Then, the materials 1 through 3 to be conveyed detects a change in the policy of the conveying machine 2, while the convey machine 2 receives the conditions of materials 1 through 3 to be conveyed. They perform the matching process described in FIGS. 12 and 33, at step 1323.

Here, the materials 1 through 3 to be conveyed use relative distances as the link target device selection condition 1135, and as a result, select the nearer conveying machine 2 as a link target. The conveying machine 2, on the other hand, establishes a link with devices in the order of earlier reception of device conditions according to the matching process employed in this embodiment. However, since "time limit for processing" is specified for the link target device selection condition field 1135, the material 1 to be conveyed having a shortest time limit for processing is finally selected, and then the conveying machine 2 becomes in the "reserved state" at step 1324. With this, the link between the material 1 to be conveyed and the conveying machine 1 is disconnected, and the conditions of the conveying machine 1 is changed to the "empty" state by a processing program in the conveying machine 1 at step 1325. After that, in a flow of steps similar to the flow of steps 1323 and 1324, the material 2 to be conveyed and the conveying machine 1 form a link, and the conveying machine assumes the "reserved" state at step 1326.

According to a method provided by this embodiment, it is possible to form a link between devices without employing manual setting or installing a dedicated server. Furthermore, by utilizing information on the conditions of each device and on the environment in which it is placed to determine whether to form a link, it is possible to flexibly control links between devices for better linking at each time point even in the environment in which the conditions and configuration of an entire system change with time due to movement of a device or a change in operating conditions.

In this embodiment, description was made of an example in which materials to be conveyed are carried to a processing machine. However, the above example may further include a different process with a different purpose in which materials are retrieved using a different time limit, still using the method provided by this embodiment in order to flexibly link each device at each time point. For example, when a fault occurs in the timer of an AV device having the function of audio/video timer recording, it is possible to link the AV device with a timer function of another device such as a computer or a telephone installed in the same house in operation after reconfiguration of the system.

Fifth Embodiment

According to a fifth embodiment of the present invention, as described below, when a device cannot determine a link target device in advance, each device actually operates and feeds back the operation results in order to form a link between devices.

Figure 18:
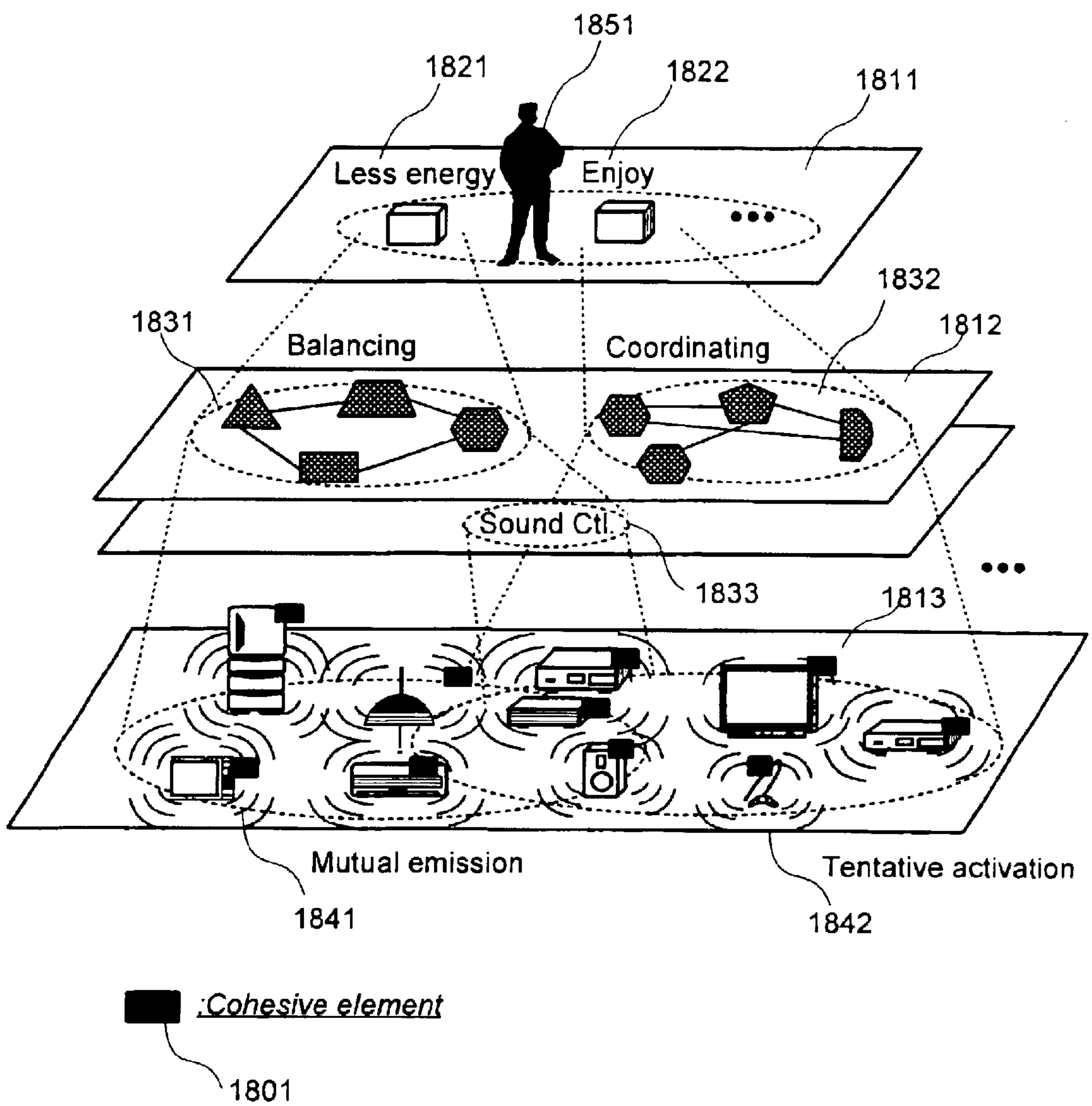
FIG. 18 is a diagram showing the concept of the system configuration of a fifth embodiment according to the present invention.

FIG. 18 is a diagram showing the concept of the system configuration according to this embodiment. In the following description, each numeral indicates an illustration in the figure. In this system, there exist a plurality of devices 1813, and processing programs of these devices are linked in operation based on a user request 1811 at stage 1812. In this embodiment, these devices are linked in operation according to purposes of the user 1851, such as "energy-saving operation (Less Energy)" 1821 and "amusement (Enjoy)" 1822 forming corresponding groups of devices such as the Balancing group 1831 and the Coordinating group 1832 respectively as link ranges. Processing programs of a device can belong to one of the groups as a unit. On the other hand, when a plurality of devices collectively operate by forming a subgroup such as the Sound Ctl subgroup 1833, they can collectively belong to one of the groups to perform a link operation as a unit. Devices operate while transmitting their conditions to one another in group 1841. Furthermore, devices may tentatively operate to determine how they influence one another, and they form a group by linking devices having much influence on the group and disconnecting the links with devices having little influence on the group.

Description will be made of a structure of the dynamic link management table 125 according to this embodiment. The purpose identifier field 1911 stores an identifier of a purpose for which processing programs are linked, and in this embodiment, stores such an identifier as "energy-saving operation (Less Energy)" or "amusement (Enjoy)". The link target field 1912 stores the name of a linked device, the name of a linked process, and the name of the interface of the linked process. The "process name and interface name of present device" field 1913 stores the name of a linked process of the present device and its interface name. The link state field 1914 stores a link state between the processes registered in a record, and specifically stores a connection condition such as the "linked" state or the "unlinked" state.

Figure 20:
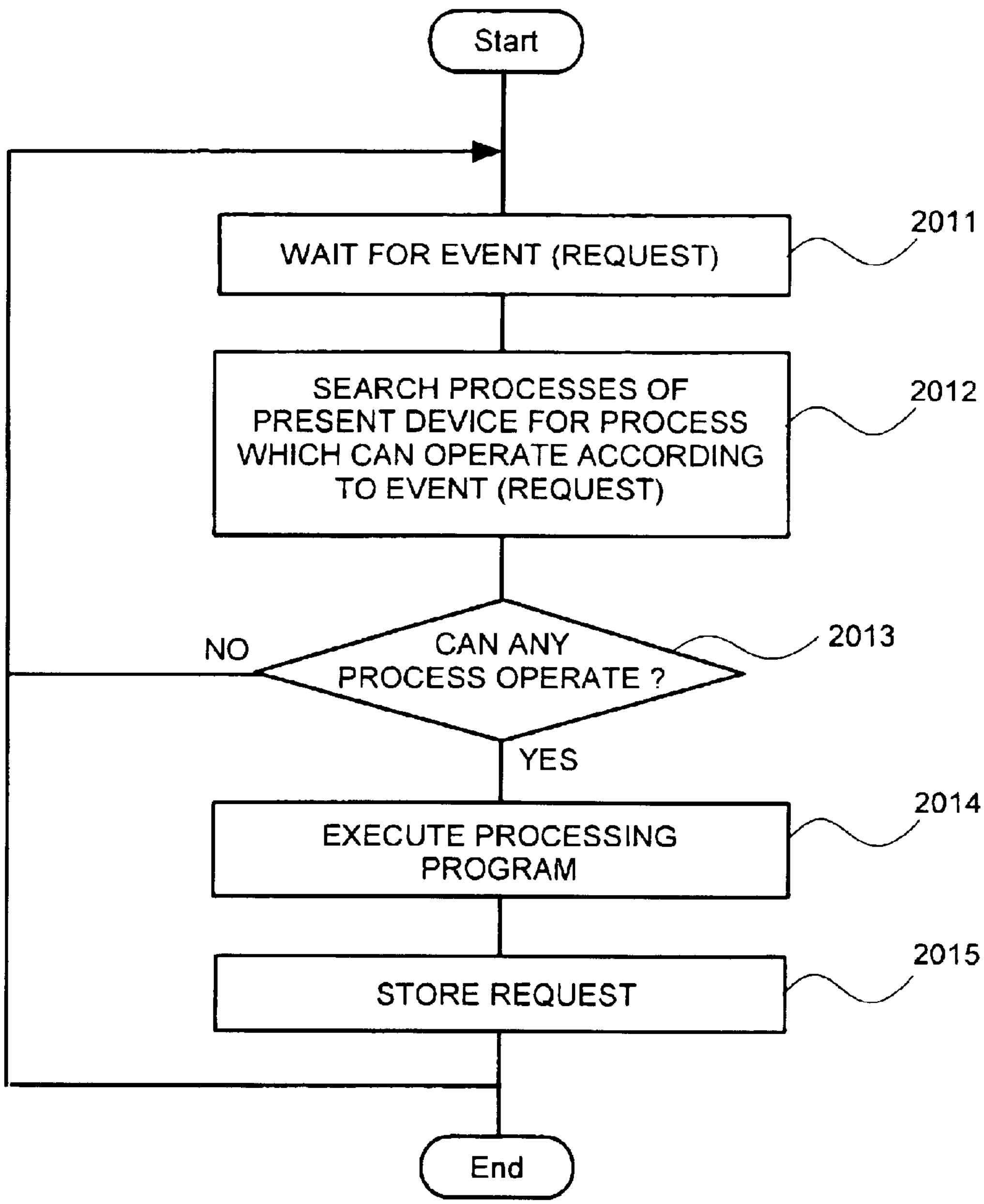
FIG. 20 is a flowchart showing a request determination process included in link control processing according to the fifth embodiment of the present invention.

FIG. 20 is a flowchart showing a request determination process included in the link control processing 113 according to this embodiment. The process takes the following steps. A device waits for an operation request event to be transmitted by another device or a user at step 2011. Upon receiving the operation request, the device determines whether any of its own processes can process the request at step 2012. In this embodiment, an operation request is received as a request for an interface of a processing program. For example, the "energy-saving mode setting" interface is requested for the purpose of energy-saving operation. Naturally, a receiving device can analyze a received interface request so as to provide a filter to convert the requested interface into a matching interface of its own. For example, when a receiving lighting device does not have any processing program with the "energy-saving mode setting" interface, it can use its "turning off half lights" interface after mapping it to the "energy-saving mode setting" interface by use of a filter.

Next, the results obtained at step 2012 is checked at step 2013. When the device has a process which can process the request, the processing program is executed at step 2014. The device stores the request, the name of the requesting device, the name of the requesting processing program, the name of the interface of the requesting processing program, the name of its own processing program, and the name of the interface of its own processing program in its dynamic link management table described in FIG. 19, at step 2015.

According to a method provided by this embodiment, by using a mechanism as described above, it is possible to tentatively operate each device so as to dynamically search for a link target even when a device to be linked cannot be specified in advance. When the results of the tentative operation do not satisfy a target value, or exceeds a target value, fine adjustments can be made to the unsatisfactory or exceeding part to meet the purpose. For example, in the case shown in FIG. 18, from among devices which are activated for the "amusement" purpose, a vacuum cleaner may be turned off in adjustment since it is not necessary.

Figure 34:
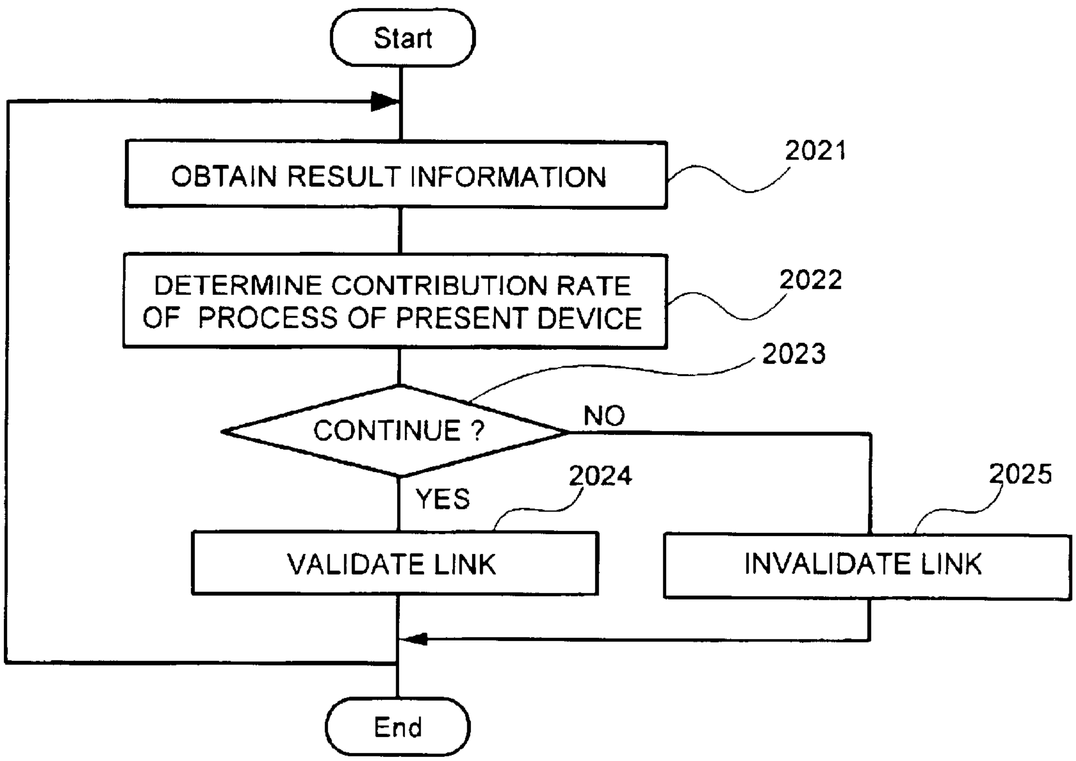
FIG. 34 is a flowchart showing a link updating process included in link control processing according to the fifth embodiment of the present invention.

FIG. 34 is a flowchart showing a link updating process included in the link control processing 113 according to this embodiment. This process is activated after a processing program is tentatively performed, and obtains the results of the tentative processing by the processing program at step 2021. Here, the result information is obtained through communication processing from the device which has transmitted the request, or directly obtained through a sensor. Then, the device which tentatively performed the processing determines the contribution rate of its own process at step 2022 to decide whether to continue the link at step 2023. Here, a contribution rate is a degree of contribution which a process of a device gives to attaining a purpose. For example, for the "energy-saving operation" purpose, a contribution rate means the ratio of a power consumption reduction made by tentative processing by a process of a device, to total power consumption. If a device cannot obtain the contribution rate of its linked process, the device continues the link. Various algorithms can be used to determine whether to continue an existing link. The algorithms include comparison of a contribution rate with a predetermined constant value, for example, a contribution of 10% or more, and dynamic calculation of a threshold level for attaining a purpose.

When it is determined that the link should be continued at step 2023, the link is left as it is, or if the link has been invalidated, the link is validated at step 2024. When it is determined that the link should not be continued, it is invalidated to stop its tentative processing, at step 2025. Then, the link updating process is repeated from the start.

By including a feedback process such as one described in this embodiment, it is possible to change the link relationship described in FIG. 20 according to changes in environmental conditions. In a house system, for example, since devices in operation change depending on the time of day such as when a meal is being prepared or during daytime hours when not many people are present or when family members gather in the evening, devices to be operated for "energy-saving operation" also change depending on the time of day. Furthermore, lighting devices to be activated also change according to the time of day such as the morning time, the daytime, or the evening time, and changes in ambient conditions. When the energy-saving operation is requested, devices in operation may form a link with one another or each device checks the request so that the most power-consuming device is turned off in control operation. Alternatively, based on the set operation priority of each device, devices may be turned off in the order of low priority to high. For example, when a reserved program is being recorded by a video recorder, the video recorder may have high priority. A light in an unoccupied room, on the other hand, may have low priority. In the energy-saving operation, power consumption of a device may be reduced instead of turning off the device. Similarly, the volume of a TV set or a radio may be turned down, and the intensity of a light may be reduced in control operation.

According to a configuration provided by the present invention, a luminous intensity sensor and a light may exchange data with each other for feedback control. This makes it possible to reduce the intensity of a light when the intensity sensor indicates that the intensity is high even though the light is in a currently unoccupied room. In an another control system, when a person returns home and pushes a start button for this system mounted on the porch, lights linked with sensors are turned on in halls and rooms as the person passes through. In this system, lights may be turned off after the person has passed through. Thus, by continuously performing processing described in this embodiment, it is possible to link devices according to changes in the environment.

Sixth Embodiment

According to a sixth embodiment of the present invention, as described below, when a device cannot determine a link target device in advance, the device establishes a link with one device after another which can be linked in order to form a link relationship.

Figure 22:
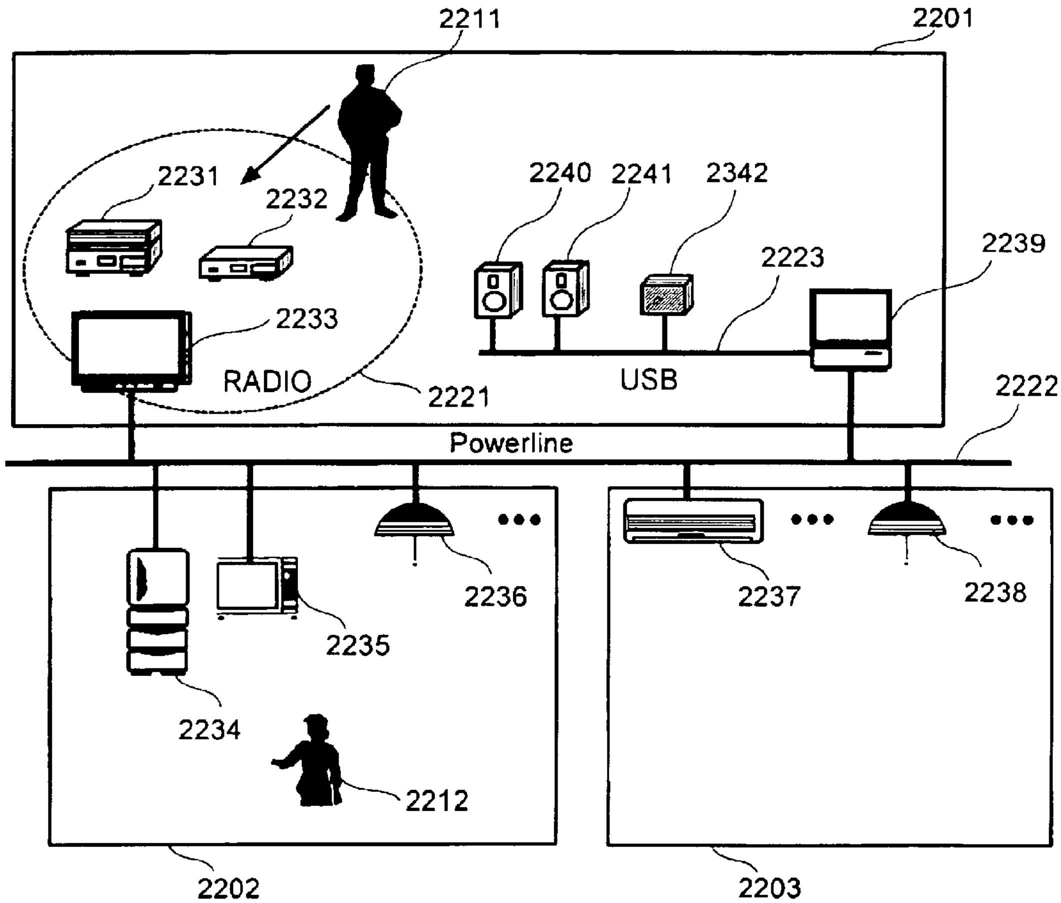
FIG. 22 is a diagram showing a system configuration of a sixth embodiment according to the present invention.

FIG. 22 is a diagram showing a system configuration of the sixth embodiment according to the present invention. The figure shows a configuration of a system employed in a house, and the system is composed of rooms 2201 through 2203. The room 2201 contains a tuner 2231, a video player/recorder 2232, and a TV set 2233, which can communicate with one another through radio communication 2221. The room 2201 also contains a personal computer 2239, speakers 2340 and 2341, and an external storage unit 2242, each connected to a universal serial bus (USB) 2223. The room 2202 contains a refrigerator 2234, an electric oven 2235, and an electric light 2236 which are connected to one another through an AC power line 2222, while the room 2203 contains an air-conditioner 2237 and an electric light 2238 which are also connected to each other through the AC power line 2222. The TV set 2223 functions as a gateway between the radio communication 2221 and the AC power line 2222, and similarly, the personal computer 2239 acts as a gateway between the AC power line 2222 and the USB 2223. The AV devices 2231 through 2233 in the room 2201 are used by a user 2211, while devices 2234 through 2236 in the room 2202 are controlled by a user 2212. Thus, many devices are connected by various transmission media in the house.

This embodiment provides a method in which a user can control a system having a configuration with as many devices as those in the above example without knowing the details of the system configuration. This method can be suitably applied to systems having a complex configuration, such as the case of the "energy-saving operation" described in the fifth embodiment in which a device that should perform fall-back operation cannot be specified at the time of receiving the request, or a case in which speakers connected to a personal computer are controlled from the remote controller of an AV device.

Figure 23:
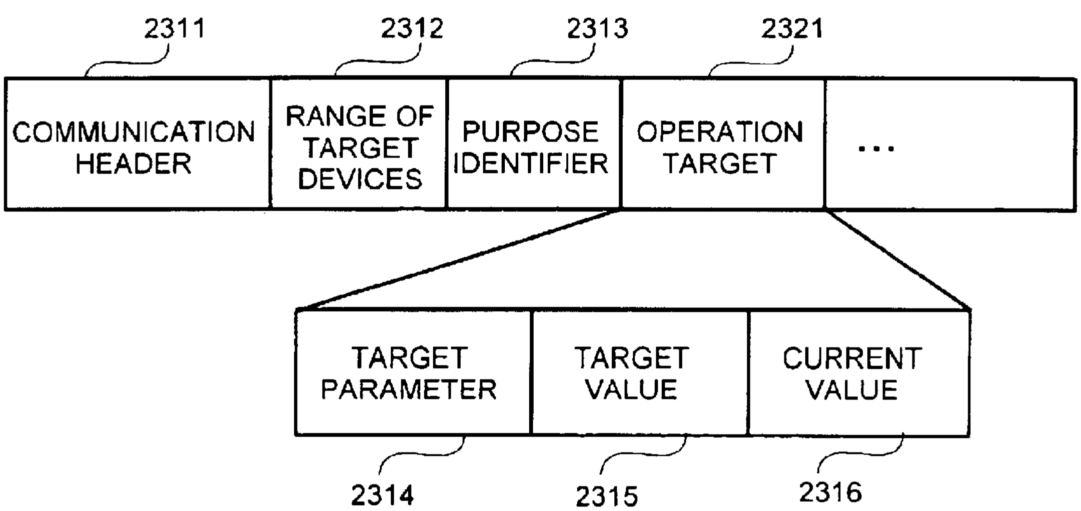
FIG. 23 is a diagram showing a format of a request message according to the sixth embodiment of the present invention.

FIG. 23 is a diagram showing the format of a request message according to this embodiment. The message is composed of a communication header field 2311, a "range of target devices" field 2312, a purpose identifier field 2313, and an operation target field 2321 including a target parameter field 2314, a target value field 2315, and a current value field 2316. The communication header 2311 is used in communication processing, and stores information on the address of a transmitting device, the address of a destination device, and a broadcast address. The "range of target devices" field 2312 stores an identifier indicating a range of target devices which should receive the request.

Specifically, the "range of target devices" field 2312 stores an identifier for a network segment, a room, or a building containing target devices. The purpose identifier field 2313 stores an identifier indicating a request to be relayed from device to device, and the purpose identifier is mapped to an interface of a process in a device as is the case with the purpose identifier described in the fifth embodiment. The target parameter field 2314 included in the operation target field 2321 stores the identifier of a target parameter for the request such as "electric power", and the target value field 2315 stores a target value for the parameter, such as "100 W". The current value field 2316 stores a value of the parameter obtained when the request has been relayed, for example, "30 W". For speaker control in which on/off control is employed, the target parameter field 2314, the target value field 2315, and the current value field 2316 store, for example, "number of speakers", "2 units", and "0 unit", respectively.

Figure 24:
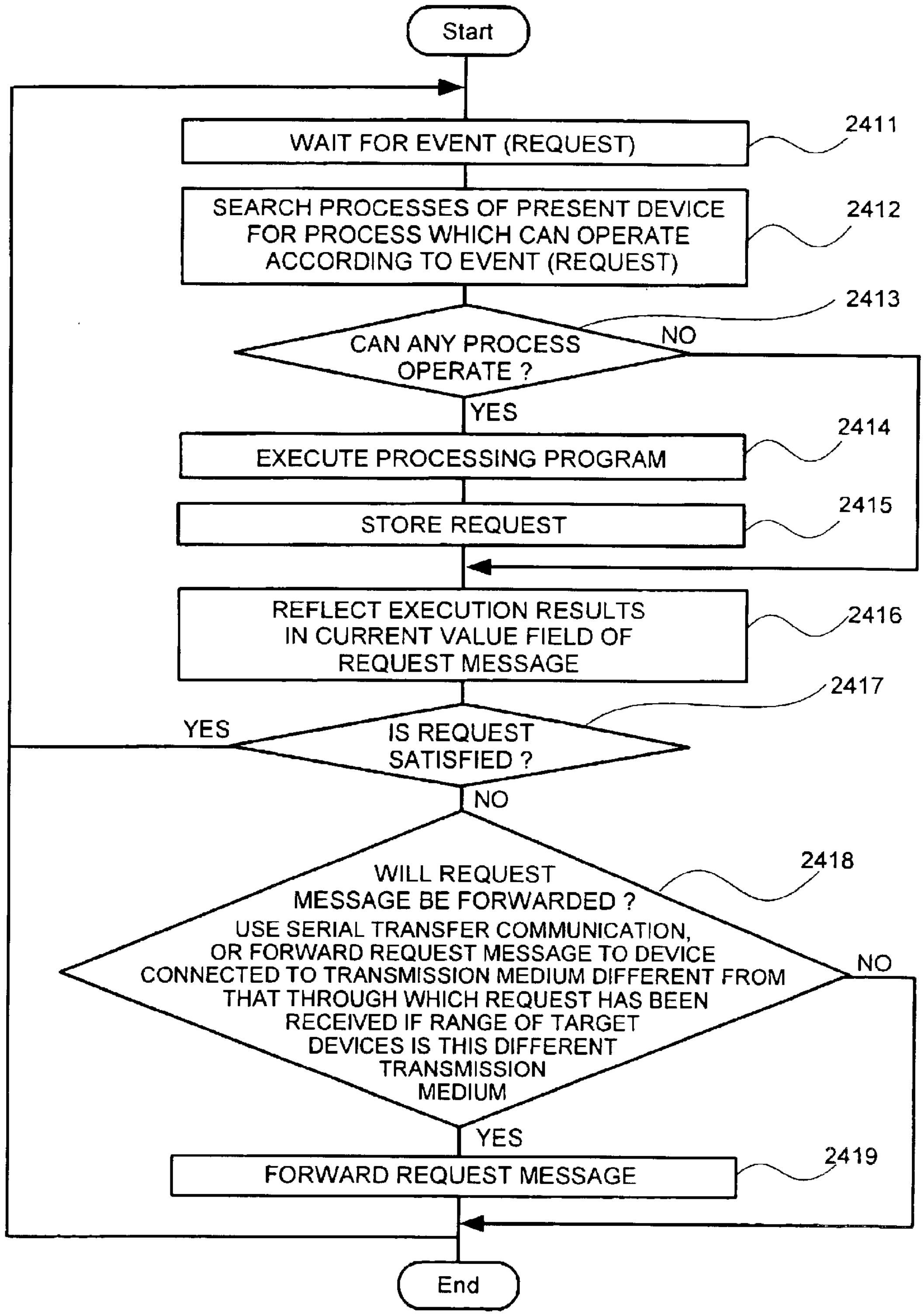
FIG. 24 is a flowchart showing a request determination process included in link control processing according to the sixth embodiment of the present invention.

FIG. 24 is a flowchart showing a request determination process included in the link control processing 113 according to this embodiment. The process takes the following steps. A device waits for an operation request event to be transmitted by another device or a user at step 2411. Upon receiving the operation request, the device determines whether any of its own processes can process the request at step 2412. Here, the judgement as to whether there is any process which can preferably process the request is made by considering each of the following factors: a load on each device and whether or not any other device having high priority is in operation, in addition to determining whether or not any process has a matching interface. When there are a large number of devices of a specific type, each of devices of other types may intentionally run a dummy load program at random to increase its own processing load so that it cannot accept an operating request from outside. This leads to load sharing among devices of the specific type and spare capacity of each type to be used for handling an unexpected event.

Next, the results obtained at step 2412 is checked at step 2413. When the device has no process which can process the request, the request determination process returns to step 2416. When the device has a process which can process the request, the processing program is executed at step 2414. The device stores the request, the name of the requesting device, the name of the requesting processing program, the name of the interface of the requesting processing program, the name of its own processing program, and the name of the interface of its own processing program in its dynamic link management table described in FIG. 19, at step 2415.

Then, the result obtained by executing the processing program is reflected in the current value field in the corresponding operation target field of the received request message at step 2416. In the case where the request message is received from a medium such as a USB in which a message is sent from one device to another serially, the processing result of a device is reflected in the current value field by adding the result to the last value in the field. In the case where a broadcast request message is received through, for example, radio transmission, the processing result of each device connected to the medium is put together and reflected in the current value field by writing the total value over the last value in the field. For the target parameter "electric power" in the "energy-saving operation" request message, for example, saved electric power obtained by changing operation of each device is accumulated in the current value field. For the target parameter "number of speakers" in the "speaker control" request message, whether each device can process the request message is determined for the current value field.

After the current value is reflected at step 2416, whether the target value of the request message is met is determined at step 2417, and when it is met, the request determination process returns to step 2411 waiting for an event to occur. When it is not met, on the other hand, whether the request message should be forwarded is determined at step 2418. If it is determined that the request message should be forwarded, the request message in which the current value has been reflected at step 2416 is transferred at step 2419. Here, in the case of use of a USB which employs serial communication, the judgement as to whether to forward a request message is made by considering whether or not a next device is available. In the case of use of a transmission medium employing parallel transmission, such as radio communications, the judgement is made by considering whether a device is connected to a transmission medium different from that through which a request message has been received. In addition, whether or not the range of target devices specified in the request message is valid in the destination should be checked when determining whether to transfer the request message.

According to this embodiment, even when devices to be linked cannot be determined in advance, devices each can establish a link with one another which can be lined by locally judging its functions, capability, and conditions in order to dynamically form links according to conditions. That is, links between devices can be formed through local operations without sharing information on the functions and conditions of each device across the entire system. Furthermore, even when there are a large number of devices, it is possible to select a specific device to be controlled.

What is claimed is:

1. An inter-device cooperative control method wherein each of a plurality of devices having a communication function communicates with another device, said inter-device cooperative control method comprising the steps of:

providing each of said plurality of devices with functional information including at least one of information on a function possessed by a device and information on a function to be performed on the device, environmental information on the environment in which the device is located, status information which indicates the progress of at least one of a process performed by the device and a process performed on the device, and contribution rate information which indicates an amount of contribution a process either performed by or performed on the device adds to attaining a predetermined purpose;

extracting plural devices from said plurality of devices, each device of said plural devices performing a process to determine whether said device is to be linked to others of said plural devices based on said contribution rate information, when said device receives purpose data;

obtaining information on a process to be performed by said plurality of devices or information on a process to be performed on the extracted plural devices, this information obtaining step being performed by the extracted plural devices; and determining a process to be performed by the extracted plural devices or a process to be performed on the extracted plural devices based on said obtained information and said functional information, said environmental information, and said status information, this process determining step being performed by the extracted plural devices;

wherein at least one of the extracted plural devices is movable;

wherein said environmental information includes position information indicating a position of a device; and wherein when said position information is changed based on movement of the at least one movable device, said at least one movable device broadcasts the changed position information to the other devices.

2. The inter-device cooperative control method as claimed in claim 1, wherein a plurality of pieces of information are obtained by said arbitrary device and said plurality of pieces of information include functional information, environmental information, and status information on said plurality of devices.

3. The inter-device cooperative control method as claimed in claim 1, wherein information obtained by said arbitrary device is a request for a process to be performed by said plurality of devices or a process to be performed on said plurality of devices.

4. The inter-device cooperative control method as claimed in claim 1, wherein said position information includes at least one of an absolute position of the device, a relative position of the device to another device, and a distance obtained based on a route which can be used by the device.

5. The inter-device cooperative control method as claimed in claim 1, wherein said plurality of devices operate to perform a predetermined process, said predetermined process including information of changing of conditions of said predetermined process.

6. An inter-device cooperative control system composed of a plurality of devices having a communication function, each of said plurality of devices communicating with another device, said inter-device cooperative control system comprising:

storage means for storing functional information including at least one of information on a function possessed by a device and information on a function to be performed on the device, environmental information on the environment in which the device is located, status information which indicates the progress of at least one of a process performed by the device and a process performed on the device and contribution rate information which indicates an amount of contribution a process either performed by or performed on the device adds to attaining a predetermined purpose, said storage means being owned by each of said plurality of devices;

means for extracting plural devices from said plurality of devices each device of said plural devices performing a process to determine whether said device is to be linked to others of said plural devices based on said contribution rate information, when said device receives purpose data, and obtaining information on a process to be performed by said plurality of devices or information on a process to be performed on the extracted plural devices, said obtaining of information being performed by the extracted plural devices; and means for determining a process to be performed by the extracted plural devices or a process to be performed on the extracted plural devices based on information obtained by said arbitrary device and functional information, environmental information, and status information each possessed by the extracted plural devices;

wherein at least one of the extracted plural devices is movable;

wherein said environmental information includes position information indicating a position of a device; and wherein when said position information is changed based on movement of the at least one movable device, said at least one movable device broadcasts the changed position information to the other devices.

7. The inter-device cooperative control system as claimed in claim 6, wherein a plurality of pieces of information are obtained by said arbitrary device and said plurality of pieces of information include functional information, environmental information, and status information on said plurality of devices.

8. The inter-device cooperative control system as claimed in claim 6, wherein information obtained by said arbitrary device is a request for a process to be performed by said plurality of devices or a process to be performed on said plurality of devices.

9. The inter-device cooperative control system as claimed in claim 6, wherein said position information includes at least one of an absolute position of the device, a relative position of the device to another device, and a distance obtained based on a route which can be used by the device.

10. The inter-device cooperative control system as claimed in claim 6, wherein said plurality of devices operate to perform a predetermined process, said predetermined process including information of changing conditions of said predetermined process.

11. A device employed in an inter-device cooperative control system in which a plurality of devices communicate with one another, said device comprising:

storage means for storing functional information including at least one of information on a function possessed by the device and information on a function to be performed on the device, environmental information on the environment in which the device is located, status information which indicates the progress of at least one of a process performed by the device and a process performed on the device, and contribution rate information which indicates an amount of contribution a process either performed by or performed on the device adds to attaining a predetermined purpose;

means for extracting plural devices from said plurality of devices, each device of said plural devices performing a process to determine whether said device is to be linked to others of said plural devices based on said contribution rate information, when said device receives purpose data, and obtaining information on a process to be performed by the extracted plural devices or information on a process to be performed on the extracted plural devices; and means for determining a process to be performed by the extracted plural devices or a process to be performed on the extracted plural devices based on information obtained by other devices and functional information, environmental information, and status information each possessed by the device;

wherein at least one of the extracted plural devices is movable;

wherein said environmental information includes position information indicating a position of a device; and wherein when said position information is changed based on movement of the at least one movable device, said at least one movable device broadcasts the changed position information to the other devices.

12. The device as claimed in claim 11, wherein pieces of information are obtained by the device and said plurality of pieces of information include functional information, environmental information, and status information on said plurality of devices.

13. The device as claimed in claim 11, wherein information obtained by said other devices is a request for a process to be performed by said plurality of devices or a process to be performed on said plurality of devices.

14. The device as claimed in claim 11, wherein said position information includes at least one of an absolute position of the device, a relative position of the device to another device, and a distance obtained based on a route which can be used by the device.

15. The device as claimed in claim 11, wherein said plurality of devices operate to perform a predetermined process, said predetermined process including information of changing of conditions of said predetermined process.

* * * * *